(12) United States Patent
Lee et al.

(10) Patent No.: US 12,230,030 B2
(45) Date of Patent: Feb. 18, 2025

(54) OBJECT FILTERING AND INFORMATION DISPLAY IN AN AUGMENTED-REALITY EXPERIENCE

(71) Applicant: Google LLC, Mountain View, CA (US)

(72) Inventors: Jessica Lee, Brooklyn, NY (US); Christopher James Kelley, Orinda, CA (US); Alok Aggarwal, Foster City, CA (US); Harshit Kharbanda, Pleasanton, CA (US)

(73) Assignee: GOOGLE LLC, Mountain View, CA (US)

( * ) Notice: Subject to any disclaimer, the term of this patent is extended or adjusted under 35 U.S.C. 154(b) by 121 days.

(21) Appl. No.: 18/084,710

(22) Filed: Dec. 20, 2022

(65) Prior Publication Data

US 2023/0368527 A1 Nov. 16, 2023

Related U.S. Application Data

(60) Provisional application No. 63/340,078, filed on May 10, 2022.

(51) Int. Cl.
*G06V 20/20* (2022.01)
*G06F 16/9535* (2019.01)
(Continued)

(52) U.S. Cl.
CPC .......... *G06V 20/20* (2022.01); *G06F 16/9535* (2019.01); *G06T 11/00* (2013.01); *G06V 10/945* (2022.01); *G06T 2200/24* (2013.01)

(58) Field of Classification Search
CPC ...... G06V 20/20; G06V 10/945; G06V 10/16; G06V 10/255; G06F 16/9535; G06F 16/583; G06F 16/783; G06F 3/0484; G06F 3/167; G06T 11/00; G06T 2200/24; G06T 19/006; G06T 5/50; G06T 19/20; G10L 2015/223; G06Q 30/0623; G06Q 30/0639; G06Q 30/0643

See application file for complete search history.

(56) References Cited

U.S. PATENT DOCUMENTS 11,263,821 B1 3/2022 Singh et al.
11,386,167 B2 7/2022 Cheng et al.
(Continued)

FOREIGN PATENT DOCUMENTS

| JP | 2010/118019 | 5/2010 |
|---|---|---|
| WO | WO 2018/217008 | 11/2018 |
| WO | WO 2022/075972 | 4/2022 |

*Primary Examiner* — Said Broome
*Assistant Examiner* — Andrew Shin
(74) *Attorney, Agent, or Firm* — DORITY & MANNING P.A.

(57) ABSTRACT

Systems and methods for providing scene understanding can include obtaining a plurality of images, stitching images associated with the scene, detecting objects in the scene, and providing information associated with the objects in the scene. The systems and methods can include determining filter tags or query tags that can be selected to filter the plurality of objects, which can then be provided as information to the user to provide further insight on the scene. The information may be provided in an augmented-reality experience via text or other user-interface elements anchored to objects in the images.

20 Claims, 34 Drawing Sheets

(51) Int. Cl.
    *G06T 11/00*     (2006.01)
    *G06V 10/94*     (2022.01)

(56) References Cited

U.S. PATENT DOCUMENTS

| | | | |
|---|---|---|---|
| 11,651,589 | B2 | 5/2023 | Badr et al. |
| 2012/0299962 | A1* | 11/2012 | White .............. H04N 21/42202 345/633 |
| 2013/0218721 | A1* | 8/2013 | Borhan .................. G06Q 30/02 705/26.41 |
| 2016/0253710 | A1* | 9/2016 | Publicover .............. H04W 4/21 705/14.66 |
| 2018/0341811 | A1 | 11/2018 | Bendale et al. |
| 2019/0251502 | A1 | 8/2019 | Fujisawa |
| 2020/0218910 | A1* | 7/2020 | Herman .................... B60R 1/27 |
| 2021/0303855 | A1 | 9/2021 | Anvaripour et al. |
| 2022/0129497 | A1 | 4/2022 | Jin et al. |
| 2023/0343091 | A1* | 10/2023 | Guo ...................... G06V 10/245 |
| 2023/0377331 | A1 | 11/2023 | Scott-Green et al. |

\* cited by examiner

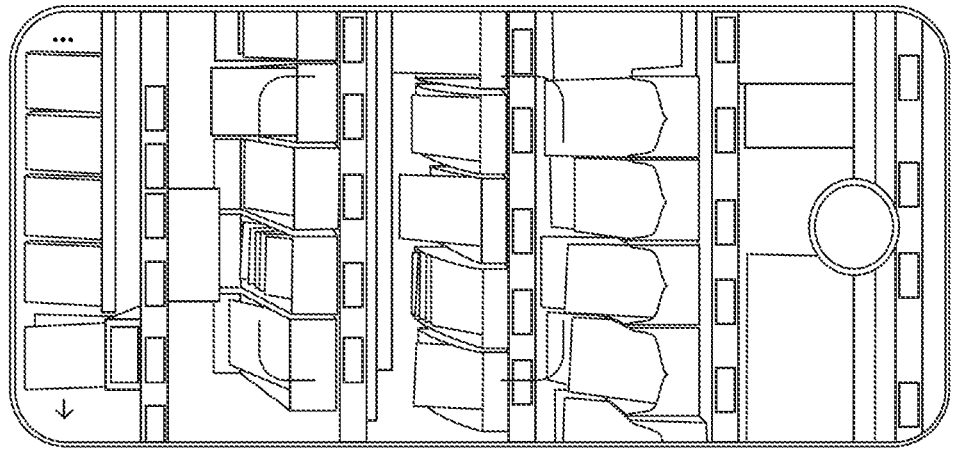
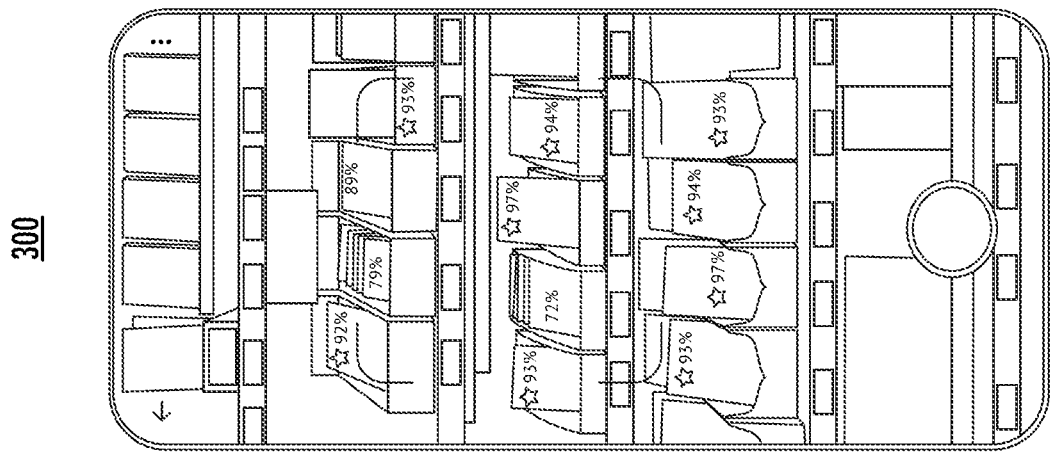
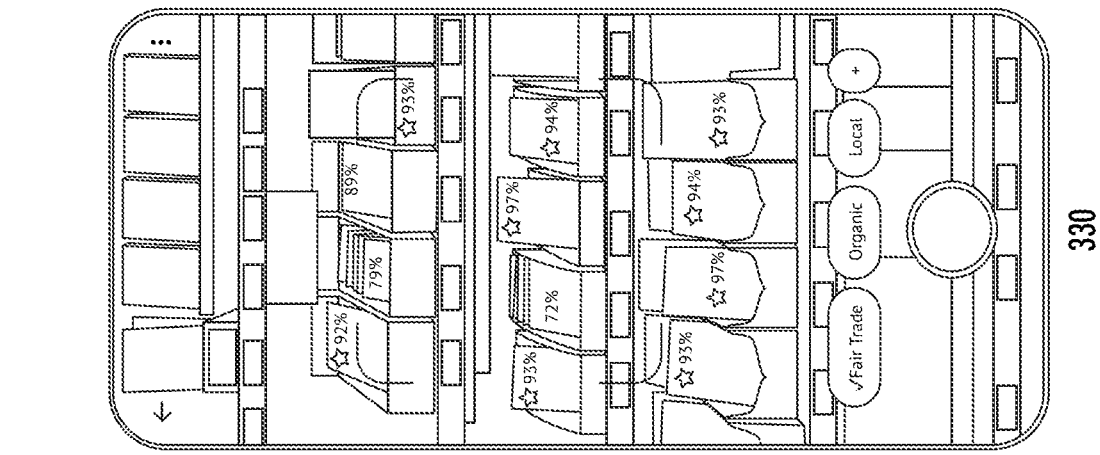
FIG. 3A

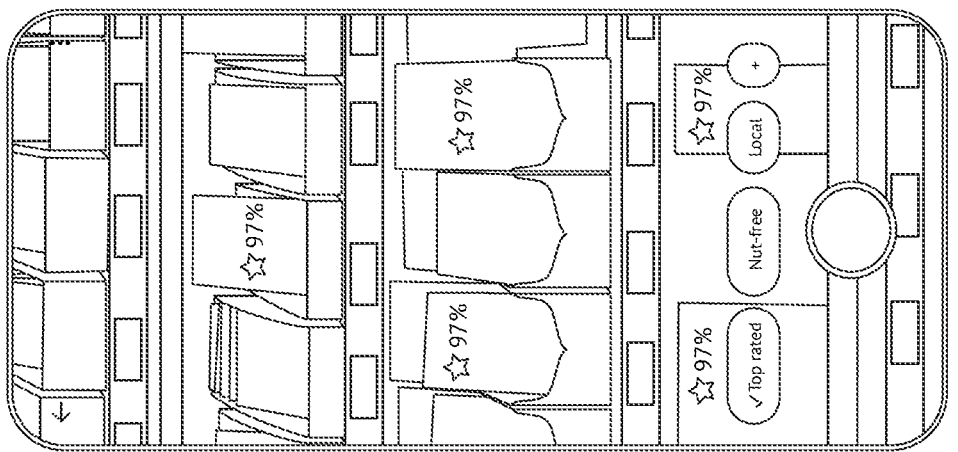
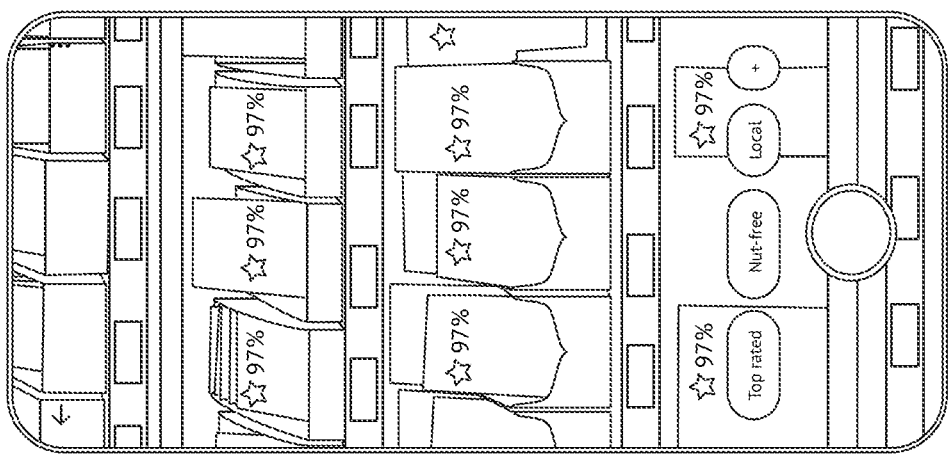
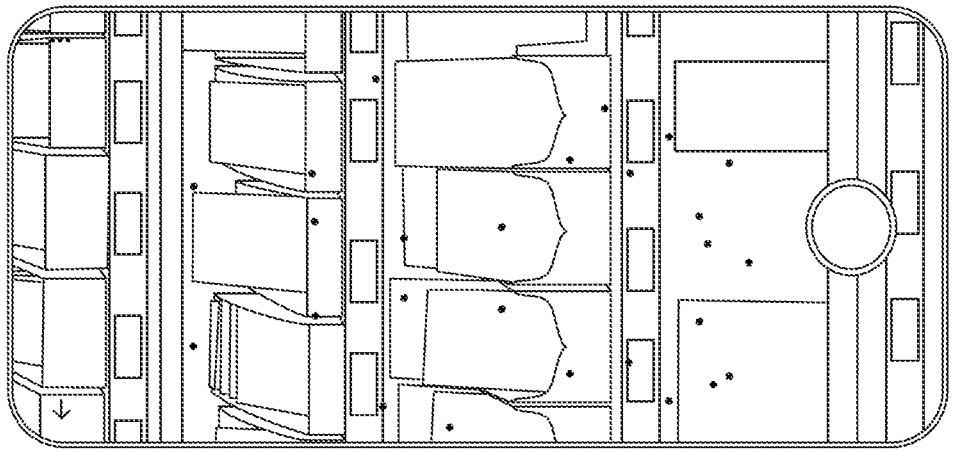
FIG. 4A

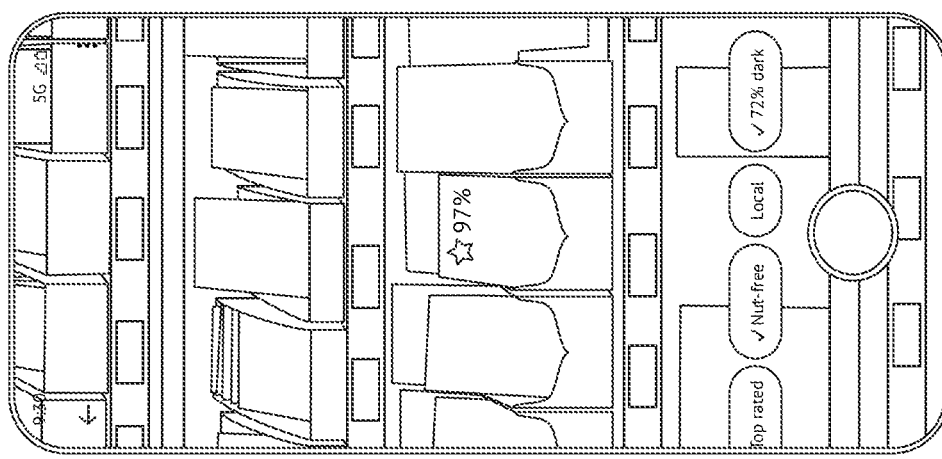
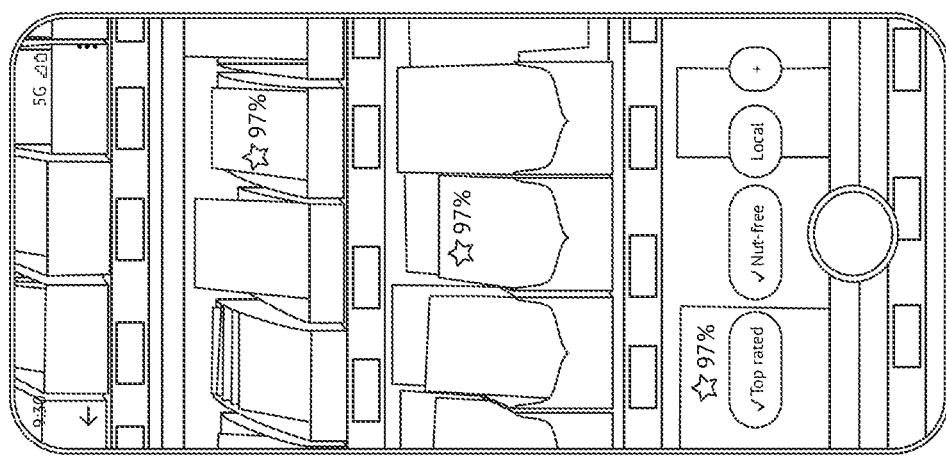
FIG. 4B

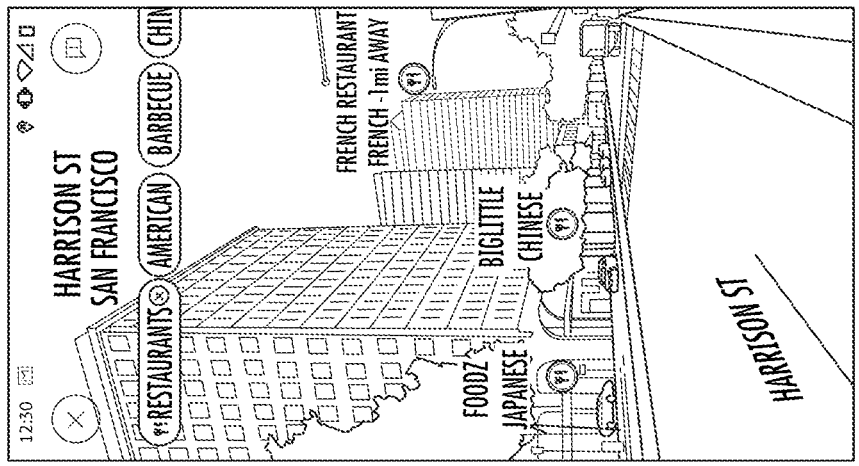
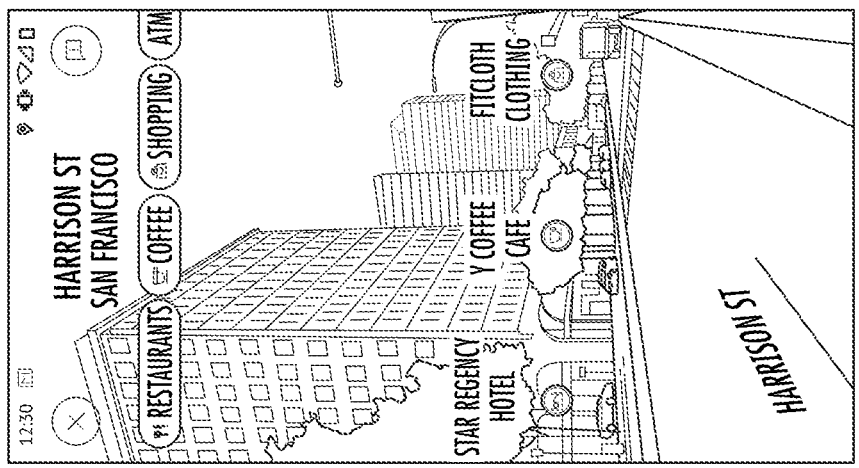
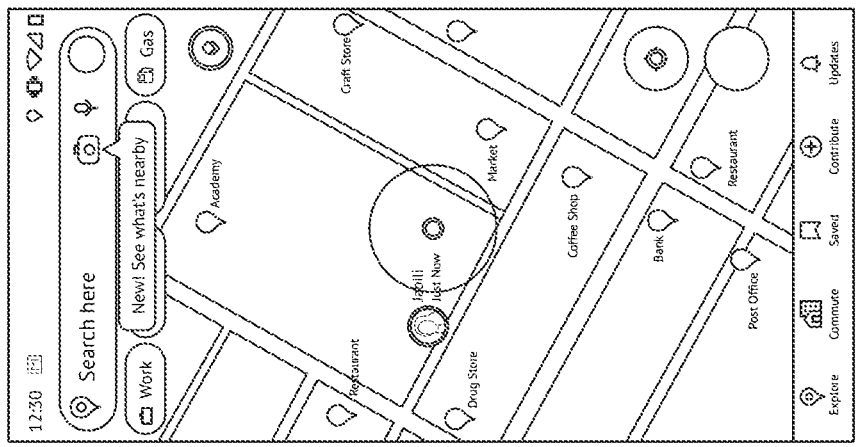
FIG. 10A

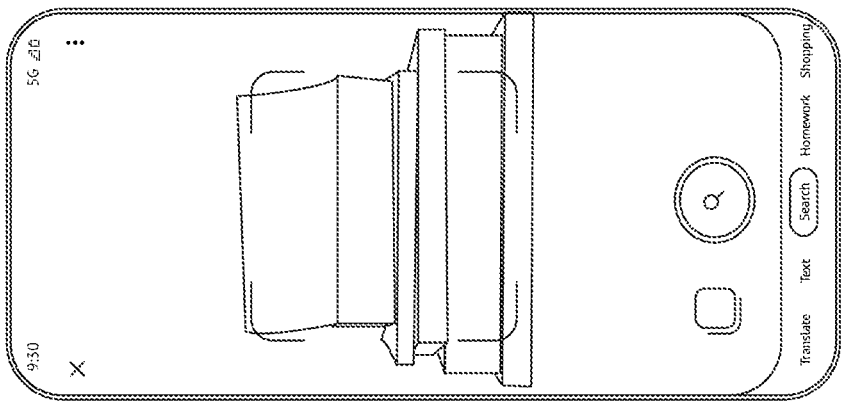
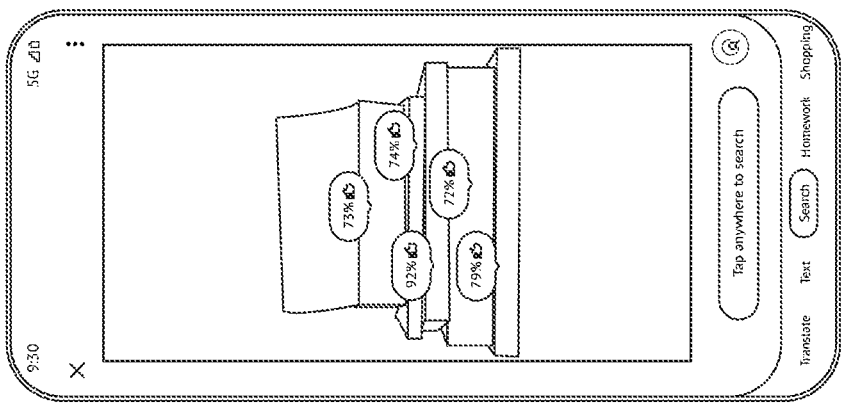
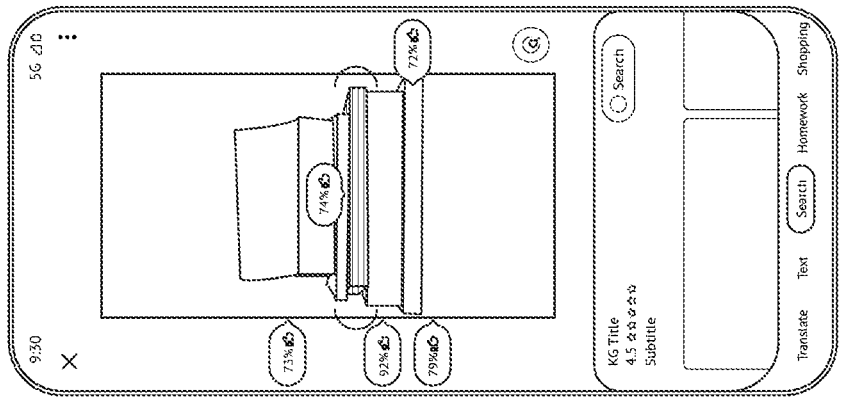
FIG. 11

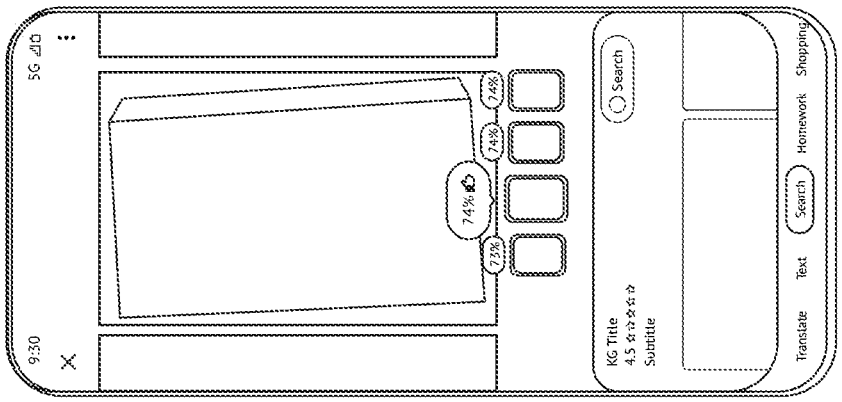
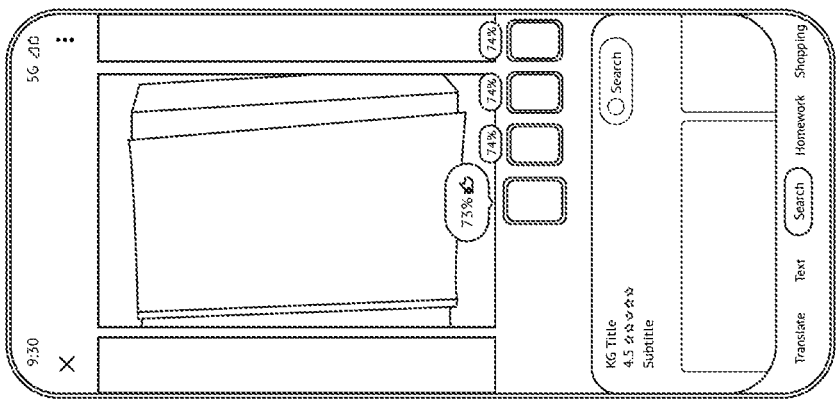
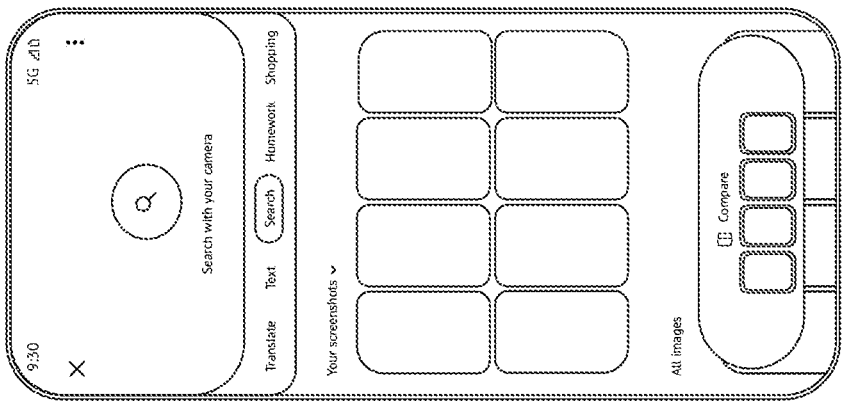
FIG. 12

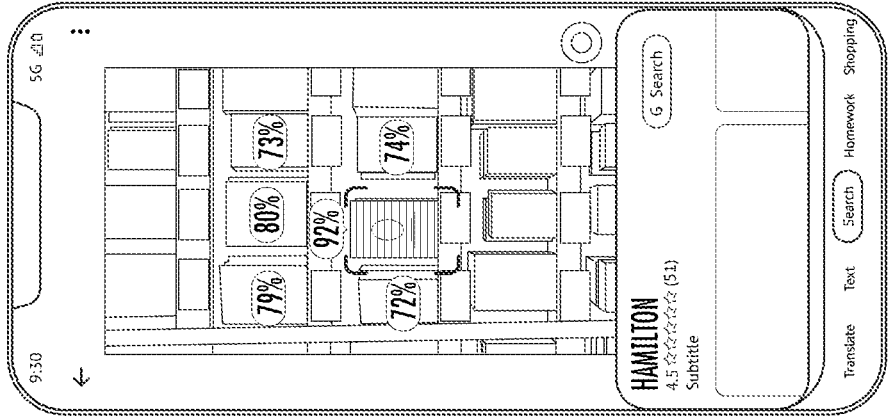
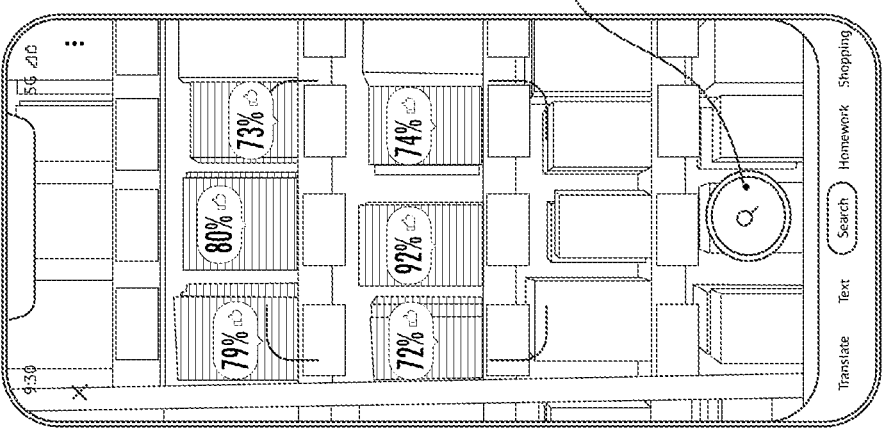
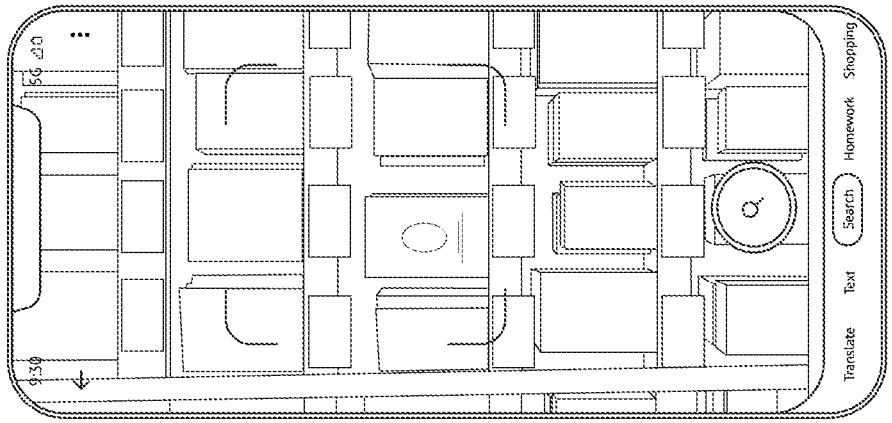
FIG. 14

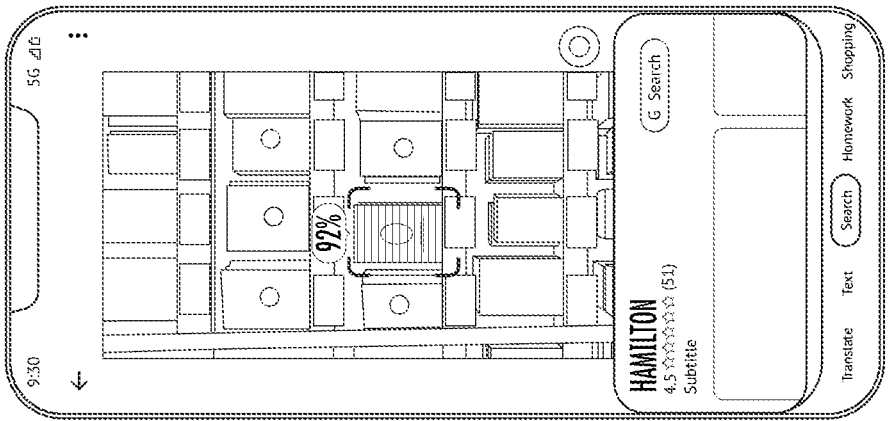
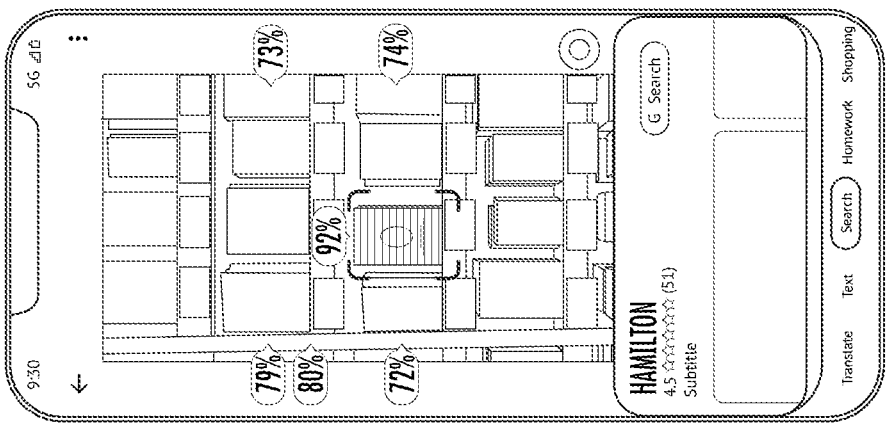
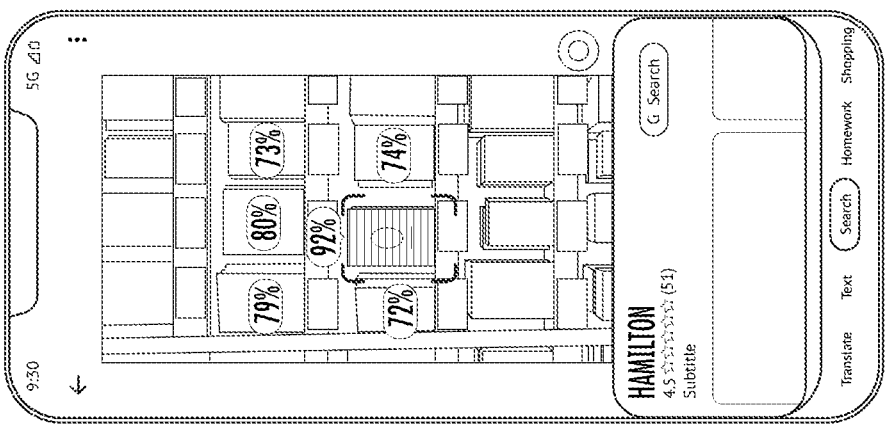
FIG. 15

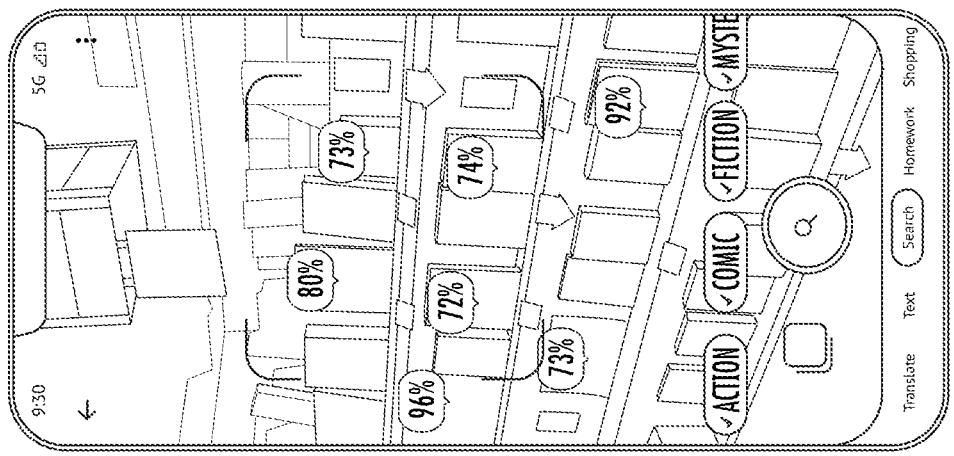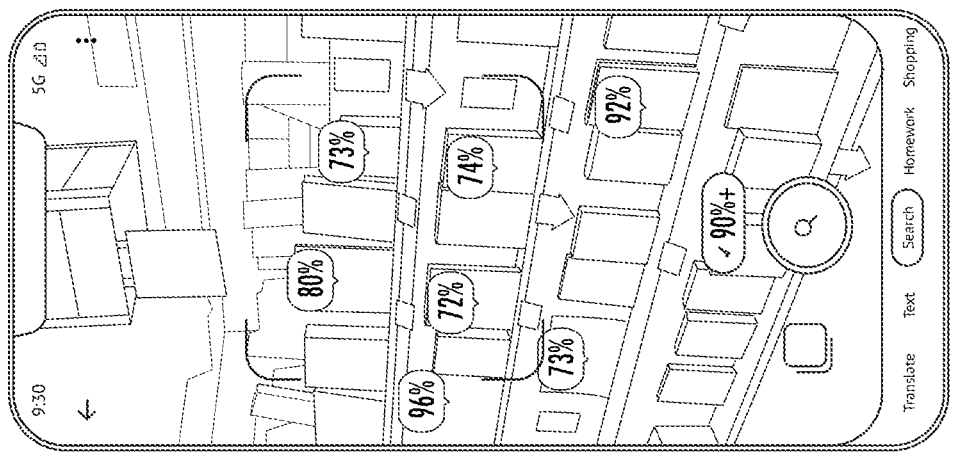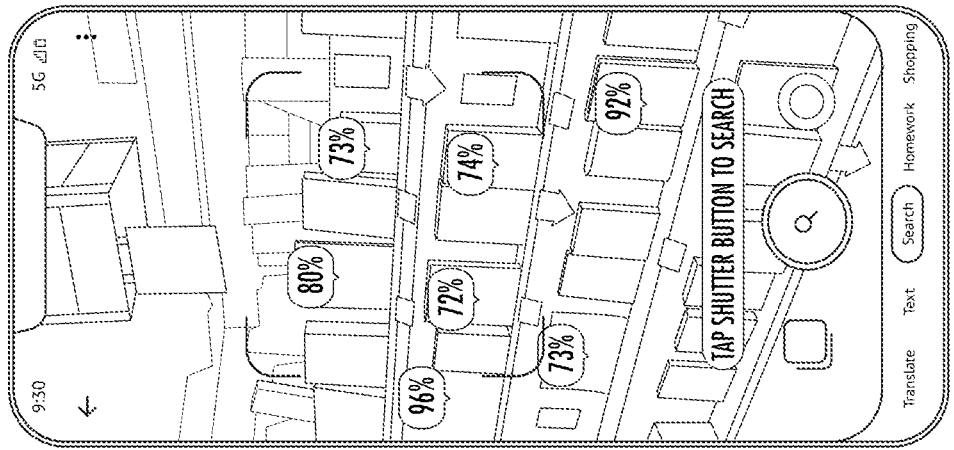
FIG. 17

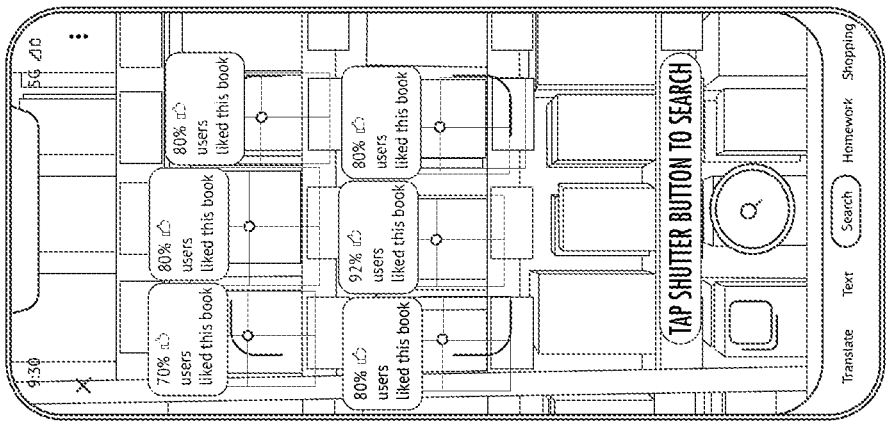
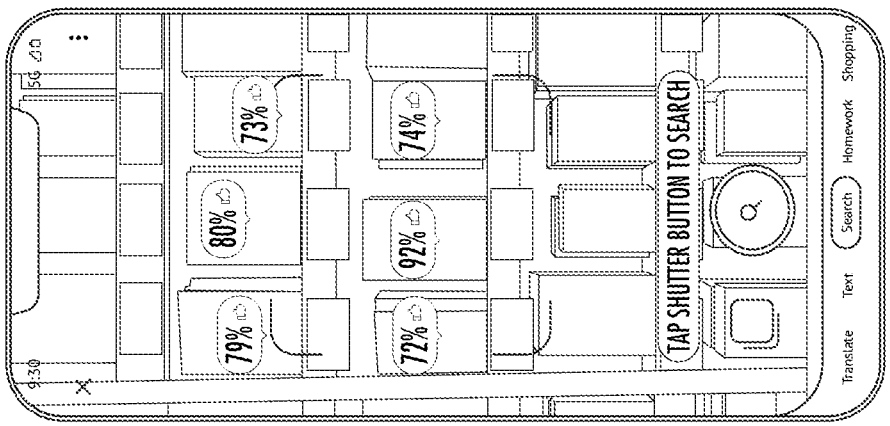
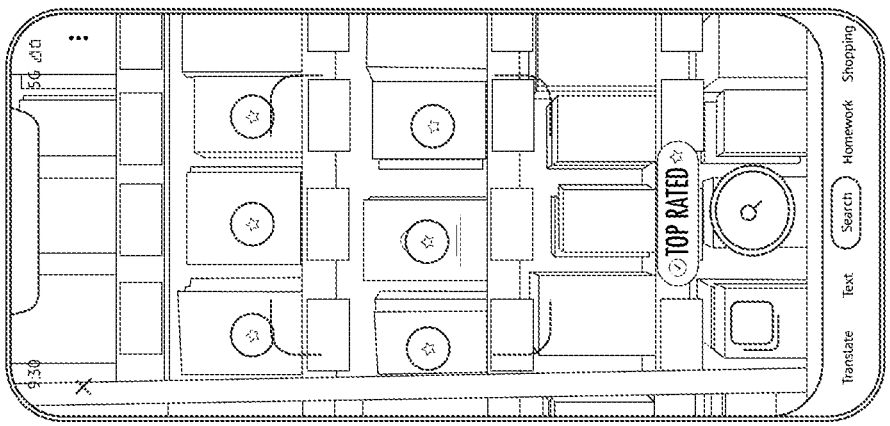
FIG. 21

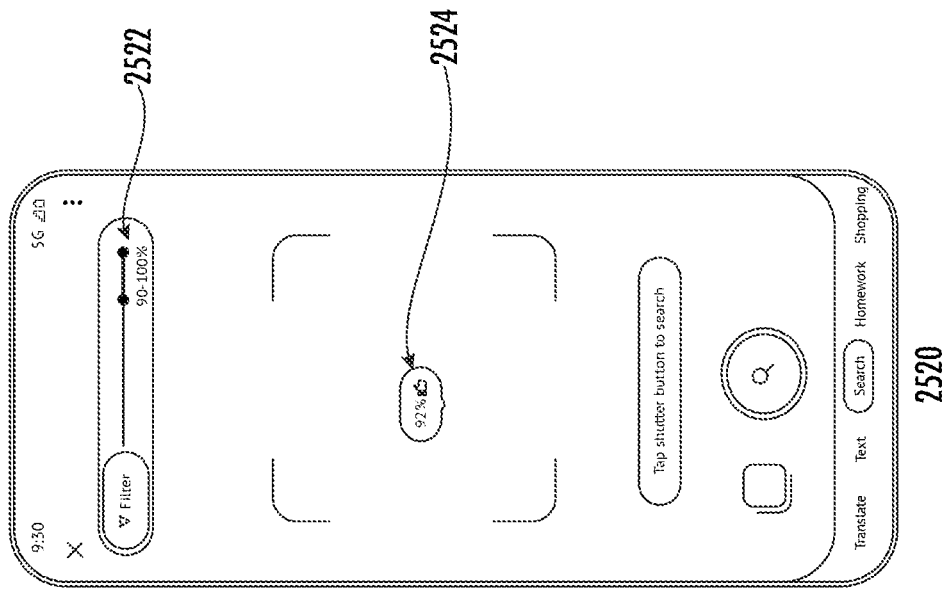
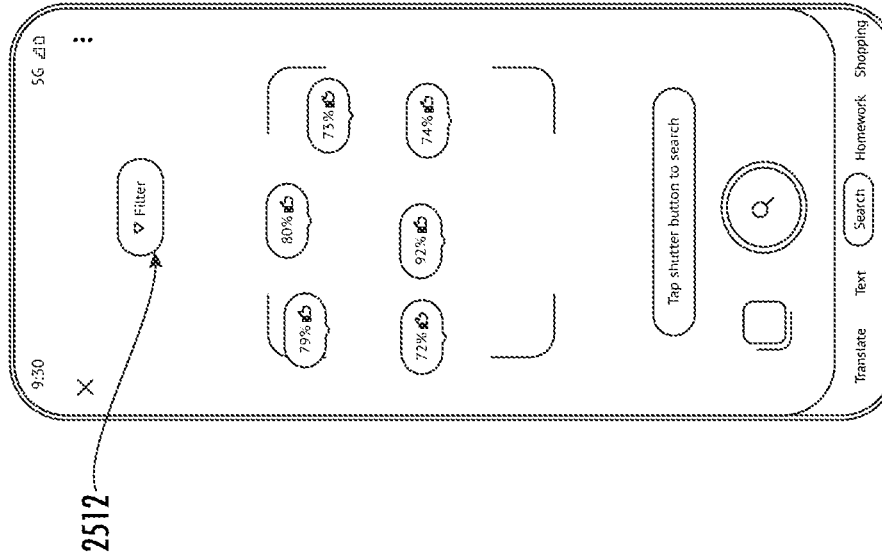
FIG. 25

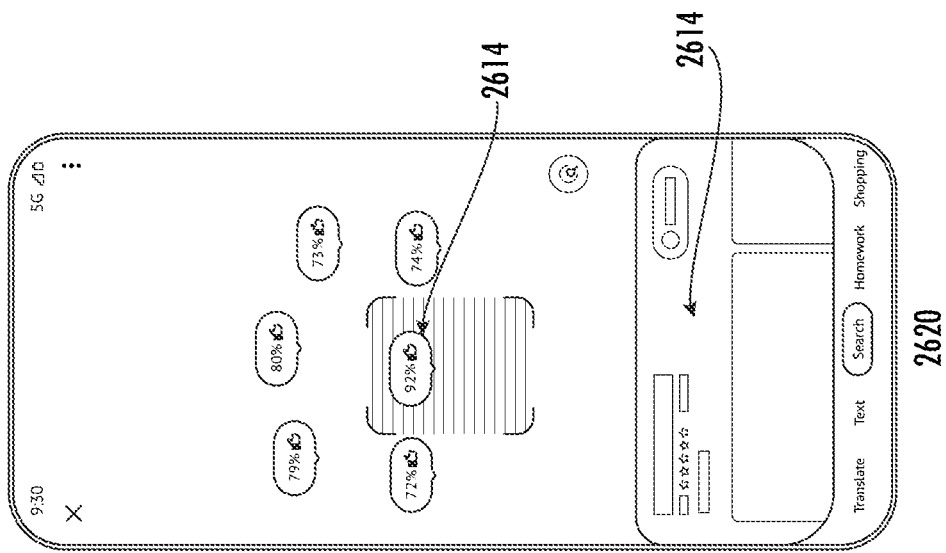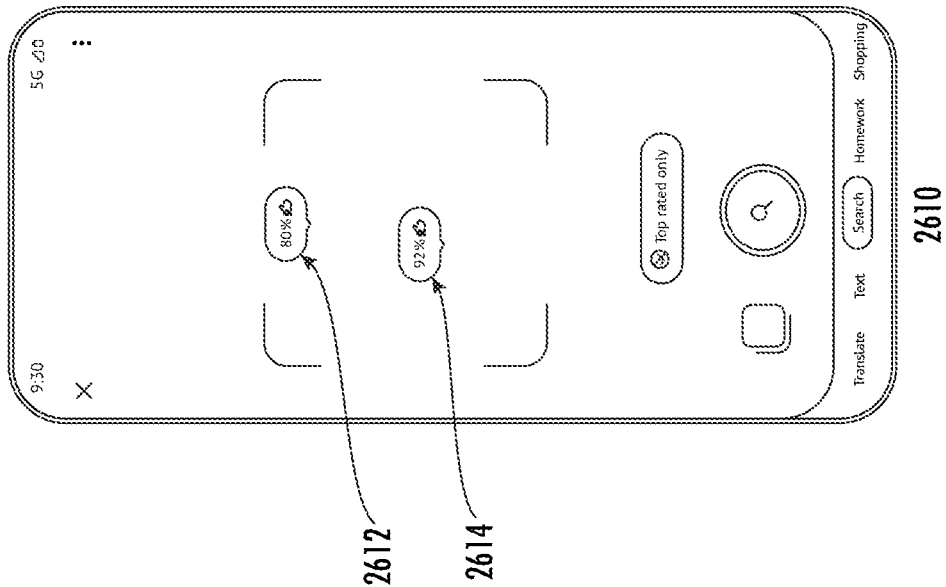
FIG. 26

OBJECT FILTERING AND INFORMATION DISPLAY IN AN AUGMENTED-REALITY EXPERIENCE

RELATED APPLICATIONS

This application claims priority to and the benefit of U.S. Provisional Patent Application No. 63/340,078, filed May 10, 2022. U.S. Provisional Patent Application No. 63/340,078 is hereby incorporated by reference in its entirety.

FIELD

The present disclosure relates generally to providing a user interface that provides information associated with a scene. More particularly, the present disclosure relates to recognizing objects in a scene, generating tags associated with the objects, filtering objects based on a selection of a particular tag, and providing object-information for the filtered objects.

BACKGROUND

Understanding a scene and the objects within a scene can be difficult. In particular, understanding a scene can require repetitive and tedious searching of the objects within the scene, and at times, what to search can be difficult to determine. Additionally, a user may ask the same question at a particular location during each visit to the particular location. The user may be forced to inefficiently search the same query during each visit.

For example, a user may be on a shopping trip to a local grocery store. During the shopping trip, a user may wish to select a new coffee type or brand to try, which they may do every visit. The user may end up picking up each bag, determining a name, and searching each coffee type and brand to see which coffees meet the user's preferences. The searching can be tedious and time-consuming. Additionally, the user may have difficulty keeping track of what coffees meet the preferences and which do not. The result can cause inefficiencies that may occur during each shopping visit.

SUMMARY

Aspects and advantages of embodiments of the present disclosure will be set forth in part in the following description, or can be learned from the description, or can be learned through practice of the embodiments.

One example aspect of the present disclosure is directed to a computing system. The system can include one or more processors and one or more non-transitory computer-readable media that collectively store instructions that, when executed by the one or more processors, cause the computing system to perform operations. The operations can include obtaining image data generated by a mobile image capture device. The image data can depict a scene. The operations can include processing the image data to determine a plurality of objects in the scene. In some implementations, the plurality of objects can include one or more consumer products. The operations can include obtaining object-specific information for one or more objects of the plurality of objects. The object-specific information can include one or more details associated with each of the one or more objects. The operations can include providing one or more user-interface elements overlaid over the image data. In some implementations, the one or more user-interface elements can be descriptive of the object-specific information.

Another example aspect of the present disclosure is directed to a computer-implemented method. The method can include obtaining, by a computing system including one or more processors, video-stream data generated by a mobile image capture device. In some implementations, the video-stream data can include a plurality of image frames. The method can include determining, by the computing system, a first image frame and a second image frame are associated with a scene. The method can include generating, by the computing system, scene data comprising the first image frame and the second image frame of the plurality of image frames. In some implementations, the method can include processing, by the computing system, the scene data to determine a plurality of objects in the scene. The plurality of objects can include one or more consumer products. The method can include obtaining, by the computing system, object-specific information for one or more objects of the plurality of objects. The object-specific information can include one or more details associated with each of the one or more objects. The method can include providing, by the computing system, one or more user-interface elements overlaid over the one or more objects. In some implementations, the one or more user-interface elements can be descriptive of the object-specific information.

Another example aspect of the present disclosure is directed to one or more non-transitory computer-readable media that collectively store instructions that, when executed by one or more computing devices, cause the one or more computing devices to perform operations. The operations can include obtaining image data. The image data can depict a scene. The operations can include processing the image data to determine a plurality of filters. The plurality of filters can be associated with a plurality of objects in the scene. In some implementations, the operations can include providing one or more particular filters of the plurality of filters for display in a user interface. The operations can include obtaining input data. The input data can be associated with a selection of a specific filter of the plurality of filters. The operations can include providing one or more indicators overlaid over the image data. The one or more indicators can be descriptive of one or more particular objects associated with the specific filter.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 3A depicts an illustration of an example object filtering and information display system according to example embodiments of the present disclosure.

FIG. 4A depicts an illustration of an example object filtering and information display system according to example embodiments of the present disclosure.

FIG. 4B depicts an illustration of an example object filtering and information display system according to example embodiments of the present disclosure.

FIG. 10A depicts an illustration of an example mobile map application use according to example embodiments of the present disclosure.

FIG. 11 depicts an illustration of an example book filtering based on ratings according to example embodiments of the present disclosure.

FIG. 12 depicts an illustration of an example object-specific information display according to example embodiments of the present disclosure.

FIG. 14 depicts an illustration of an example book filtering based on ratings according to example embodiments of the present disclosure.

FIG. 15 depicts an illustration of example object-specific search user interfaces according to example embodiments of the present disclosure.

FIG. 17 depicts an illustration of example user-interface elements according to example embodiments of the present disclosure.

FIG. 21 depicts an illustration of example user-interface elements according to example embodiments of the present disclosure.

FIG. 25 depicts an illustration of an example rating filtering slider element for filtering based on ratings according to example embodiments of the present disclosure.

FIG. 26 depicts an illustration of an example search interface according to example embodiments of the present disclosure.

Figure 1A:
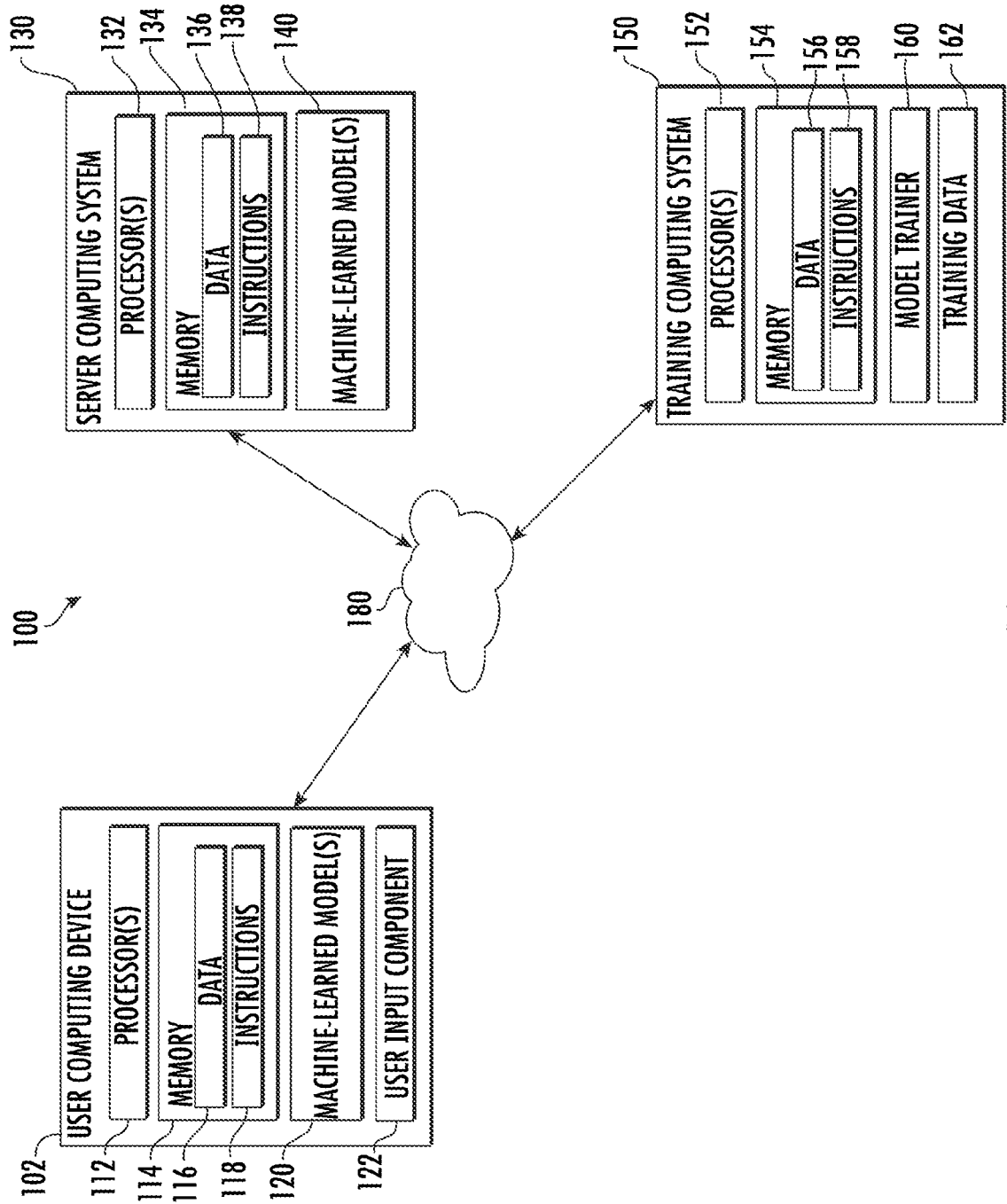
FIG. 1A depicts a block diagram of an example computing system that performs object recognition and filtering according to example embodiments of the present disclosure.

Reference numerals that are repeated across plural figures are intended to identify the same features in various implementations.

DETAILED DESCRIPTION

Overview

Generally, the present disclosure is directed to systems and methods for providing object-specific information via augmented-reality overlays. In particular, the systems and methods disclosed herein can leverage image processing techniques (e.g., object detection, optical character recognition, reverse image search, image segmentation, video segmentation, etc.) and augmented-reality rendering to provide a user interface that overlays object-specific details over objects depicted in image data. For example, the systems and methods disclosed herein can be utilized to obtain image data, process the image data to understand the scene, and provide details about the scene via an augmented-reality experience. In some implementations, the systems and methods disclosed herein can provide suggested filters or candidate queries that can be utilized to provide more information on recognized objects. Additionally and/or alternatively, object-specific information (e.g., ratings or ingredients for a specific object) can be obtained and overlaid over the image of the objects. In some implementations, the systems and methods disclosed herein can provide suggested filters or candidate queries that can be utilized to provide more information on recognized objects. Additionally and/or alternatively, object-specific information (e.g., ratings or ingredients for a specific object) can be obtained and overlaid over the image of the objects. For example, the systems and methods can include obtaining image data generated by a mobile image capture device. The image data can depict a scene. The image data can be processed (e.g., with one or more machine-learned models stored locally on the device) to determine a plurality of objects in the scene. In some implementations, the plurality of objects can include one or more consumer products (e.g., products for sale in a grocery store (e.g., coffee, chocolate, soda, books, toothpaste, etc.)). The systems and methods can include obtaining object-specific information for one or more objects of the plurality of objects. The object-specific information can include one or more details associated with each of the one or more objects. The systems and methods can include providing one or more user-interface elements overlaid over the image data. In some implementations, the one or more user-interface elements can be descriptive of the object-specific information.

In particular, a user may open a mobile application. The user can capture one or more images with an image sensor on a mobile device. The images can be processed with a machine-learned model stored on the mobile device to determine one or more tags (e.g., one or more queries and/or one or more filters). The tags can be provided to the user via a user interface. The user may select a particular tag, which can cause the user interface to provide an augmented-reality experience that includes object-specific information overlaid over particular objects in the captured image.

The systems and methods can obtain image data (e.g., one or more images and/or a plurality of image frames including a first image frame and a second image frame associated with a scene). In some implementations, the image data can include video-stream data (e.g., a live-stream video of a scene). The video-stream data can include a plurality of image frames. The image data (e.g., the video-stream data) can be generated by a mobile image capture device (e.g., a mobile computing device with an image sensor). In some implementations, the image data can depict a scene.

In some implementations, the image data can include a plurality of frames. The plurality of frames can be processed to determine a first image frame and a second image frame are associated with a scene. The first image frame can include a first set of objects, and the second image frame can include a second set of objects. Determining the first image frame and the second image frame are associated with the scene can include determining the first set of objects and the second set of objects are associated with a particular object class.

Alternatively and/or additionally, determining the first image frame and the second image frame are associated with the scene can include determining the first image frame and the second image frame were captured at a particular location. The particular location can be determined based on the time between image frames being below a threshold time. Alternatively and/or additionally, the location can be determined based on one or more location sensors (e.g., a global positioning system on a mobile computing device). In some implementations, determining images frames are associated with one another can include processing the plurality of image frames with one or more machine-learned models (e.g., an image classification model, an image segmentation model, an object classification model, an object recognition model, etc.). The one or more machine-learned models can be trained to determine a semantic understanding of the image frames based on context and/or features detected in the scene.

In some implementations, the plurality of image frames can be associated with one another based on a determination that the image frames capture an overlapping portion of a scene and/or determining the image frames capture portions of a scene proximate to one another. The systems and methods can utilize a variety of techniques to determine that the image frames depict different portions of the same scene. The variety of techniques can include image analysis (e.g., pixel by pixel analysis), timestamp analysis (e.g., comparing metadata associated with the image frames), and/or motion data analysis (e.g., obtaining and processing motion sensor data (e.g., inertial data from an inertial motion sensor)).

The obtaining of and/or generation of the image frame can occur in response to input data received from a user. The input data can include text data, a user-interface selection, audio data (e.g., audio data descriptive of a voice command), or another form of input. Additionally and/or alternatively, the image frame association can be prompted based in part on a received input (e.g., a user-interface selection, a touch-screen interaction, a text input, a voice command, and/or a gesture).

In some implementations, the systems and methods can include generating scene data based on the first image frame and the second image frame of the plurality of image frames. The scene data can include and/or be descriptive of the first image frame and the second image frame. In some implementations, generating the scene data can include stitching the image frames together. Alternatively and/or additionally, the image frames can be concatenated. The stitched image frames can then be cropped to remove data that may not be relevant to the semantic understanding of the scene. The stitched frames may be provided for display. Alternatively and/or additionally, the stitched frames may only be used for scene understanding in the backend.

The image data can be processed to determine a plurality of objects in the scene. In some implementations, the plurality of objects can include one or more consumer products. Alternatively and/or additionally, the scene data can be processed to determine a plurality of objects in the scene, and the plurality of objects can include a plurality of consumer products (e.g., food, appliances, soaps, tools, etc.). The image data and/or the scene data may be processed to understand the scene. Processing the image data and/or the scene data can include optical character recognition, object detection and recognition, pixel by pixel analysis, feature extraction then processing, image classification, object classification, object class determination, image segmentation, and/or environment or scene classification. In some implementations, the processing can occur on a device (e.g., a mobile computing device using a machine-learned model stored on a limited computing resources device). Processing on the device can limit the resource cost of sending large amounts of data over a network to a server computing system for processing.

In some implementations, the systems and methods can determine the objects in the scene. Additionally and/or alternatively, the systems and methods can determine an object class or another form of relationship between the objects. The systems and methods can then disregard objects that are not included in the relationship (e.g., the systems and methods may only process data associated with objects of a particular object class). In some implementations, a plurality of object classes can be determined. The systems and methods can determine the more prevalent object class and/or may focus on the higher utility use cases. Alternatively and/or additionally, the systems and methods may focus on the objects associated with an object class with more previous searches. In some implementations, the systems and methods can include a bias based on user preferences or past user interactions.

In some implementations, the systems and methods can determine tags associated with multiple object classes and refine to a particular object class based on a selection. The systems and methods may focus on the one or more objects in the reticle of an image capture interface or in a focal point of the scene. Alternatively and/or additionally, the systems and methods may focus on determined user favorites and/or determined regional or global favorites. Favorites and preferences may be learned with a machine-learned model. The machine-learned model may be trained to generate a probability score associated with the processed image data and processed context data. The one or more tags can then be selected based on the probability scores (e.g., the highest probability scores may be selected and/or the probability scores above a given threshold).

A plurality of tags (e.g., candidate queries, filters, and/or annotations) can be generated based on the determined scene understanding. The tags can include candidate queries, and the candidate queries can include questions asked by other users when having similar context, questions associated with a particular object class (e.g., ingredients for foods versus genre for books), questions associated with particular detected objects, questions associated with a particular location (e.g., grocery store versus museum), and/or questions associated with past user interactions (e.g., what did a user ask during a previous trip to this location, what are common questions by the user, and/or user browsing history as it pertains to this location or object class). In some implementations, the tags (e.g., the filters, candidate queries, and/or annotations) can include data associated with a user profile including user preferences. The user profile can include allergies, which may be utilized as context data when the objects are food items. Additionally and/or alternatively, the user preferences can include genre preferences (e.g., book genres such as young adult or romance), taste preferences (e.g., sweet versus salty and/or citrus versus earthy), and/or ingredient preferences (e.g., a certain percentage of a certain ingredient and/or a limit on the number of ingredients).

The tags, or chips, can be determined and/or selected such that each tag may apply to at least one object in the scene. Additionally and/or alternatively, tags that apply to all objects may not be selected. The tags may be generated and/or determined based on determined distinguishing features between objects in the scene (e.g., the tags may include ingredients or flavor notes that differ between objects in the scene).

The systems and methods can determine one or more tags (e.g., one or more candidate queries of the plurality of candidate queries) of the plurality of tags based on the image data and/or scene data. In some implementations, the one or more tags may be determined based at least in part on obtained context data. The tags may be ranked and/or selected based on scene context, location, data associated with a specific user, and/or tag popularity among a plurality of users. The popularity may include popularity across all times or may include popularity for a given time period (e.g., trending tags). The determination of the one or more tags can include user-specific refining. In some implementations, the determination can cause the systems and methods to only show annotations or tags for high value items.

Additionally and/or alternatively, the systems and methods can obtain object-specific information for one or more objects of the plurality of objects. The object-specific information can include one or more details associated with each of the one or more objects. In some implementations, the object-specific information can include one or more consumer product details associated with each of the plurality of objects.

In some implementations, the systems and methods can include obtaining context data. The context data may be associated with a user. A query can then be determined based on the image data and the context data. The object-specific information may be obtained based at least in part on the query. In some implementations, the context data can be descriptive of at least one of a user location, user preferences, past user queries, and/or user shopping history.

In some implementations, the context data can be descriptive of a user location. For example, the systems and methods can obtain one or more popular queries associated with the user location. The query can then be determined based at least in part on the one or more popular queries.

Alternatively and/or additionally, an object class associated with the plurality of objects can be determined. The object-specific information can then be obtained based at least in part on the object class.

The systems and methods can include providing one or more user-interface elements overlaid over the image data. The one or more user-interface elements can be descriptive of the object-specific information. In some implementations, the one or more user-interface elements can be provided as overlaid over the one or more objects. The one or more user-interface elements can be descriptive of the object-specific information associated with the object that the element is overlaid over.

In some implementations, the plurality of user-interface elements can be descriptive of the object-specific information associated with the one or more objects, and the plurality of user-interface elements may be associated with the plurality of consumer products.

The one or more user-interface elements can include and/or can be descriptive of a plurality of product attributes associated with specific objects in the scene. The plurality of product attributes can include a plurality of different product types. For example, the systems and methods can obtain input data associated with a selection of a particular user-interface element associated with a particular product attribute (e.g., the particular product attribute can include a threshold product rating) and can provide one or more indicators overlaid over the image data. The one or more indicators can be descriptive of one or more particular objects associated with the one or more particular product attributes. In some implementations, the particular user-interface element can include a slider associated with a range of consumer product ratings.

In some implementations, providing the one or more user-interface elements overlaid over the one or more objects can include adjusting a plurality of pixels associated with an outside region surrounding the one or more objects. The pixel adjustment can be utilized to provide a spotlight effect that can indicate objects meeting criteria associated with a selected tag.

The systems and methods can provide the one or more user-interface elements as part of an augmented-reality experience. For example, the one or more tags can be provided as user-interface elements at the bottom of a display overlaid over one or more image frames. Additionally and/or alternatively, the one or more user-interface elements can include text or icons that are overlaid over particular objects. For example, a product attribute associated with a particular object can be anchored to the object in the augmented-reality experience. The user-interface elements can include bubbles at the bottom of the user interface and/or text anchored to objects.

Alternatively and/or additionally, the systems and methods can obtain image data. The image data can depict a scene. The image data can be processed to determine a plurality of filters. The plurality of filters can be associated with a plurality of objects in the scene. One or more particular filters of the plurality of filters can then be provided for display in a user interface. The systems and methods can then obtain input data. In some implementations, the input data can be associated with a selection of a specific filter of the plurality of filters. The systems and methods can then provide one or more indicators overlaid over the image data. The one or more indicators can be descriptive of one or more particular objects associated with the specific filter.

In some implementations, processing the image data to determine the plurality of filters can include processing the image data to recognize a plurality of objects in the scene, determining a plurality of differentiating attributes associated with differentiators between the plurality of objects, and determining the plurality of filters based at least in part on the plurality of differentiating attributes.

Additionally and/or alternatively, processing the image data to recognize the plurality of objects in the scene can include processing the image data with a machine-learned model.

The systems and methods may obtain second input data. The second input data can be associated with a zoom input. In some implementations, the zoom input can be associated with the one or more particular objects. The systems and methods can then obtain second information associated with the one or more particular objects. An augmented image can be generated based at least in part on the image data and the second information. The augmented image can include a zoomed-in portion of the scene associated with a region including the one or more particular objects. In some implementations, the one or more indicators and the second information can be overlaid over the one or more particular objects.

Additionally and/or alternatively, the one or more indicators can include object-specific information associated with the one or more particular objects. In some implementations, providing the one or more indicators overlaid over the image data can include an augmented-reality experience.

For example, the systems and methods can determine a plurality of filters associated with the plurality of objects. Each filter can include criteria associated with a subset of the plurality of objects. The plurality of filters can be provided for display in a user interface. The systems and methods can then obtain a filter selection associated with a particular filter of the plurality of filters. An augmented-reality overlay over one or more image frames can then be provided. The augmented-reality overlay can include the one or more user-interface elements being provided over respective objects that meet the respective criteria of the particular filter.

In some implementations, the systems and methods can include receiving audio data. The audio data can be descriptive of a voice command. The systems and methods can include determining a particular object associated with the voice command and providing an augmented image frame that indicates the particular object associated with the voice command. Additionally and/or alternatively, the obtained audio data can be descriptive of a voice command that can be processed with one or more images to generate an output. For example, a multimodal query can be obtained that includes one or more captured images and the audio data descriptive of a voice command (e.g., one or more images of the scene with the voice command "which cereals are organically source?"). The multimodal query can be processed to generate a response to the voice command that is determined based at least in part on the one or more images. In some implementations, the response can include one or more user interface elements overlayed over the captured images and/or a live stream of images in a viewfinder. The voice input alongside the camera input can provide a conversational assistant that is visually aware of an environment, which can enable a user to be informed of an environment as they navigate through the environment. In some implementations, the processing of the image data can be conditioned based on the voice command. For example, the image(s) may be cropped based on the voice command to segment the point or points of interest that can then be processed. Additionally and/or alternatively, the voice input and image input can be input and processed in tandem.

In some implementations, the user may capture an image of an object and may provide a voice command to request information about the specific object. The requested information can include asking about the state of the particular object. For example, a user may capture an image of a pear and may provide the voice command "Is this ripe?" The systems and methods disclosed herein can process the image and the voice command to determine a ripe classification is to be provided. The systems and methods can then process the image of the pear to output a ripe classification, which can then be provided to the user. In some implementations, data descriptive of determining a ripeness of a pear and/or data descriptive of pear nutrition or farming information may be further provided.

The voice input may be processed to generate text data descriptive of the voice command, which can be processed with the image data for search result determination. A text embedding may be generated based on the transcribed voice command, an image embedding may be generated based on the captured images, and the text embedding and image embedding can be processed to determine one or more search results.

The systems and methods disclosed herein can involve obtaining one or more inputs from a user. The user input can include a selection of a particular tag associated with a particular candidate query, a text input (e.g., which can be utilized to generate a new query and/or a new filter), a voice input, and/or an adjustment of a filter slider (e.g., for price or ratings).

In some implementations, the systems and methods disclosed herein can be utilized to filter objects in a scene to determine one or more particular objects that answer a question and/or meet one or more criteria. For example, the systems and methods disclosed herein can obtain image data, can determine a plurality of objects depicted in the image data, and can determine one or more objects in the scene that are related to or associated with the candidate query (e.g., has the given product attribute and/or meets an input criteria). The determination may involve searching the web. The searching can include extracting data from knowledge graphs, local databases, regional databases, global databases, webpages, and/or data stored on the processing device. The systems and methods may further obtain object details associated with the objects associated with the selected candidate query.

Additionally and/or alternatively, a user interface can be provided that indicates which objects are associated with or related to the selected candidate query. The user interface can highlight particular objects that are associated with selected tags (e.g., candidate queries and/or filters). In some implementations, the systems and methods can darken pixels not associated with particular objects. Additionally and/or alternatively, the systems and methods can provide indicators overlaid over the particular objects. The indicators can include object-specific details (e.g., ingredients, flavor notes, ratings, genre, etc.).

The user interface can include an augmented-reality experience. The user interface including the augmented-reality experience can be provided as part of a mobile application, a web application, and/or as part of an integrated system for a smart wearable. The systems and methods disclosed herein can be implemented in an augmented-reality application that includes augmented-reality translation, object recognition, and/or a variety of other features. Alternatively and/or additionally, the systems and methods disclosed herein can be implemented as a stand alone application. Additionally and/or alternatively, the systems and methods disclosed herein can be utilized by smart wearables such as smart glasses for learning about different scenes and objects while traversing through day to day routines.

In some implementations, the systems and methods disclosed herein can be always on and/or may be toggled on and off. The systems and methods may be provided in an application with a plurality of tabs associated with a plurality of different functions. The tab currently open during processing may be utilized as context to determine the one or more tags.

The systems and methods disclosed herein can utilize a plurality of different user interface/user experience features and elements. The elements can include two-dimensional shapes, three-dimensional shapes, text, pop-ups, dynamic elements, input boxes, graphical keyboards, expanding elements, transition effects, reticles, shading effects, and/or processing indicators. The tags can be at the bottom of the user interface, the top of the user interface, and/or on the side. The annotations can be superimposed on the objects, can be placed above or below the objects, and/or can be indicated via symbols, icons, or indicators. In some implementations, the systems and methods can include off-screen indicators that indicate an object in the scene meets the given criteria or has specific details but is not currently displayed in the user interface. Additionally and/or alternatively, the user interface may include an artificial spotlight feature utilized to indicate objects that meet a given criteria associated with a selected filter or query.

The systems and methods disclosed herein can be utilized for a variety of different uses. For example, the systems and methods can be utilized to narrow down and select objects in a scene that meet various criteria. In some implementations, the refinement can be used to select a consumer product based on ratings, ingredients, and/or attributes.

Additionally and/or alternatively, the systems and methods disclosed herein can be utilized to determine and provide object differentiators for different objects in a scene.

The systems and methods can be utilized for providing instructions on how to interact with a scene (e.g., car maintenance and/or using a particular device, such as a blender).

In some implementations, the systems and methods can be used for shopping (e.g., avoiding allergy ingredients and/or for filtering based on symptoms when shopping for medicine).

Additionally and/or alternatively, the systems and methods can determine and provide information on related objects based on the scene analysis.

In some implementations, the systems and methods disclosed herein can generate and/or determine tags such that a tag can automatically be generated to provide tags of what a user should be asking based on what is in the scene and/or based on a context. The systems and methods disclosed herein can process the scene data to determine what are search queries, or filters, that would provide the most insight into the scene and/or what would provide the most insight in what separates different objects from one another. For example, an image of coffee bags in a shopping aisle can cause the system to automatically generate tags for flavor profiles, ratings, locally sourced, fair trade, etc., and an image of books can cause the system to automatically generate tags for genres, ratings, length, time period, etc. Additionally and/or alternatively, an image of a row of businesses can cause the system to automatically generate tags for restaurants, clothing, chain business, locally-owned, open now, etc.

Additionally and/or alternatively, the tags (e.g., the filters and/or candidate queries) can include determining a plurality of candidate tags associated with the image data and/or the context data. The plurality of candidate tags can then be processed to limit the displayed tags to tags that: (1) are associated with (e.g., apply to) at least one object in the scene and (2) are not associated with all objects in the scene. The limiting of candidate queries based on one of or both factors can ensure the selection of the tag provides actual information to the user instead of leaving the user with the same options they were originally provided with when capturing the image.

Selection of a particular object and/or a tag associated with a particular object can be received and additional information on the particular object can be obtained and displayed. For example, the selection of a particular product can be received and additional product details can be obtained and displayed. The additional information can be based in part on one or more past user interactions (e.g., purchase history, search history, and/or filter tags previously selected). The additional information can be obtained by utilizing the image data and/or the recognition data as a search query to determine one or more search results that can be displayed and/or be processed to determine additional information. The search query can additionally include a text input, a voice input, and/or context data (e.g., a location, other objects in the scene, the time, user profile data, and/or an image classification).

In some implementations, the systems and methods disclosed herein can be utilized to capture (generate or obtain) and process a video. The video can be captured then processed to detect and recognize one or more objects in the video, which can then be annotated upon playback. Additionally and/or alternatively, the actions performed in the video can be determined and annotated upon playback. In some implementations, the one or more objects in the video can be segmented then searched. Additionally and/or alternatively, the annotations may be determined and provided in real time, which can then be provided as augmented-reality annotations.

The systems and methods of the present disclosure provide a number of technical effects and benefits. As one example, the system and methods can provide a real-time augmented-reality experience that can provide scene understanding to a user. In particular, the systems and methods disclosed herein can obtain image data, can process the image data, can recognize objects depicted in the image data, and can provide object-specific information for those objects. Additionally and/or alternatively, the systems and methods can process the image data and provide tags (e.g., filtering tags for filtering objects in the scene and/or query tags for obtaining specific information associated with the objects). A tag can then be selected, and the systems and methods disclosed herein can provide indicators anchored to specific objects in the image data. The indicators can include augmented-reality renderings that include object-specific information on the object it is anchored to.

Another technical benefit of the systems and methods of the present disclosure is the ability to leverage multimodal search to aid users in narrowing down selections or for learning how to interact with an environment. For example, the systems and methods disclosed herein can be utilized to extract data from an image and additionally receive voice commands, text inputs, and/or user selections which can then be utilized to generate a query based on both the features recognized in the image and the input data. The multimodal search can provide a more comprehensive search, which can then be utilized understanding the scene. For example, a user may capture an image and select one or more tags associated with user preferences in order to determine what object the user wants. Additionally and/or alternatively, one or more of those tags may be tags input via a graphical keyboard. Alternatively and/or additionally, a user may capture an image and ask how to complete a certain task. The systems and methods can then process the image and the input question to provide step by step directions with indicators overlaid over a portion of the image to provide more precise instructions.

Another example of technical effect and benefit relates to improved computational efficiency and improvements in the functioning of a computing system. For example, the systems and methods disclosed herein can leverage on-device machine-learned models and functions to process locally on the device. Processing locally on the device can limit the data that is transmitted over a network to a server computing system for processing, which can be more friendly to users with limited network access.

With reference now to the Figures, example embodiments of the present disclosure will be discussed in further detail.

Example Devices and Systems

FIG. 1A depicts a block diagram of an example computing system 100 that performs object recognition and filtering according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120 (e.g., one or more machine-learned tag generation models). For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example machine-learned models 120 are discussed with reference to FIGS. 2A-5B & 9-26.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel object recognition and tag generation across multiple instances of object recognition and filtering).

More particularly, the machine-learned model (e.g., a tag generation model) can process image data to recognize a plurality of objects in the scene depicted in the image data. The machine-learned model (e.g., the tag generation model) can determine and/or tags based at least in part on the plurality of objects and context data. The tags can be generated based on a determined prevalent object class, based on previous interactions, based on a location, and/or based on comparing details between multiple objects to determine distinguishing features. The tags can include queries or filters. The tags can then be selected to filter the objects that will be indicated as meeting specific criteria.

Additionally or alternatively, one or more machine-learned models 140 (e.g., one or more tag generation models) can be included in or otherwise stored and implemented by the server computing system 130 that communicates with the user computing device 102 according to a client-server relationship. For example, the machine-learned models 140 can be implemented by the server computing system 130 as a portion of a web service (e.g., an object find and filter service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140 (e.g., one or more machine-learned tag generation models). For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2A-5B & 9-26.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the tag generation models 120 and/or 140 based on a set of training data 162. The training data 162 can include, for example, training images, training labels (e.g., ground truth object labels and/or ground truth tags), training context data, and/or training motion data.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). In another example, the input includes visual data (e.g., one or more images or videos), the output comprises compressed visual data, and the task is a visual data compression task. In another example, the task may comprise generating an embedding for input data (e.g., input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
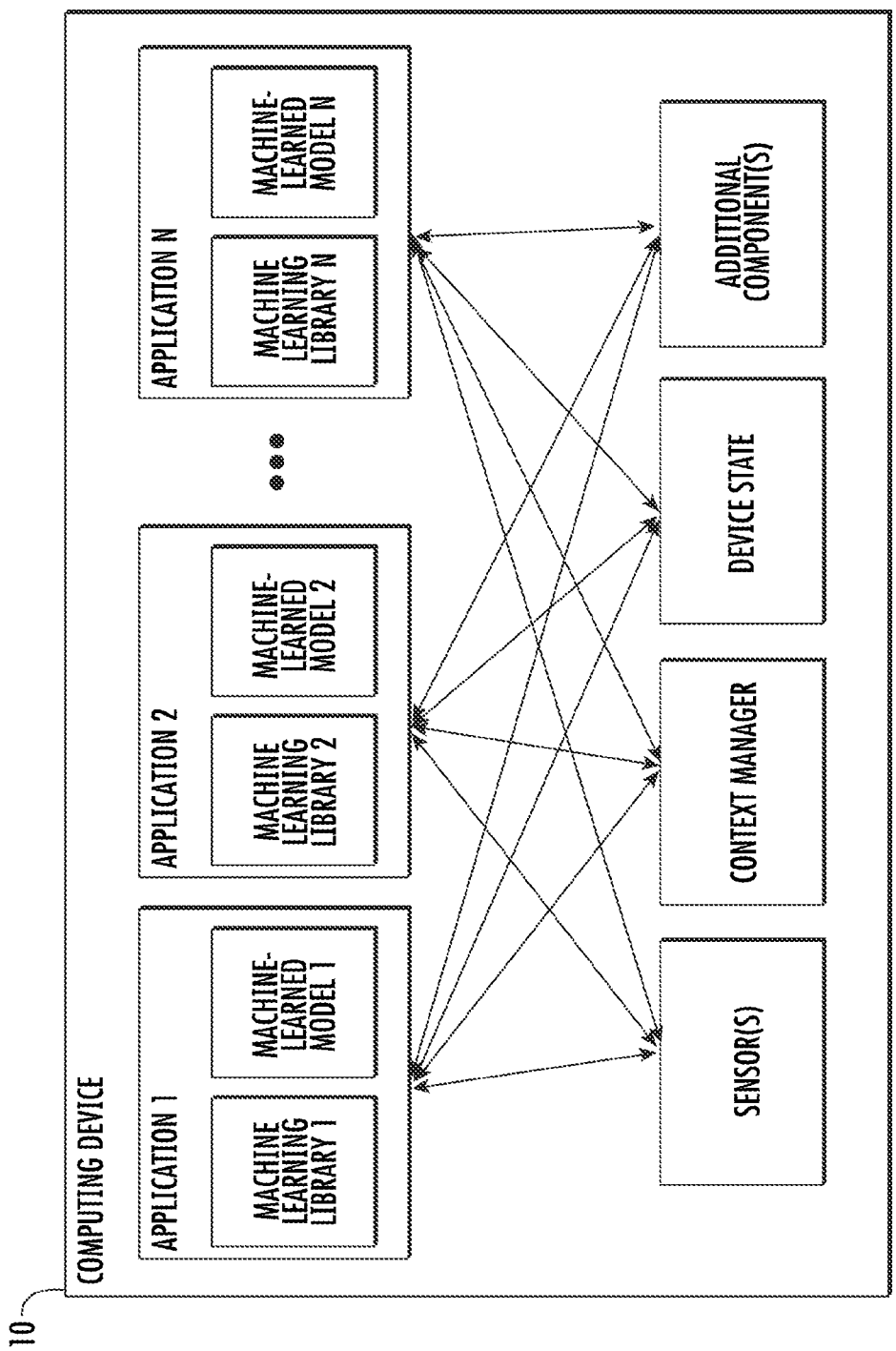
FIG. 1B depicts a block diagram of an example computing device that performs object recognition and filtering according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
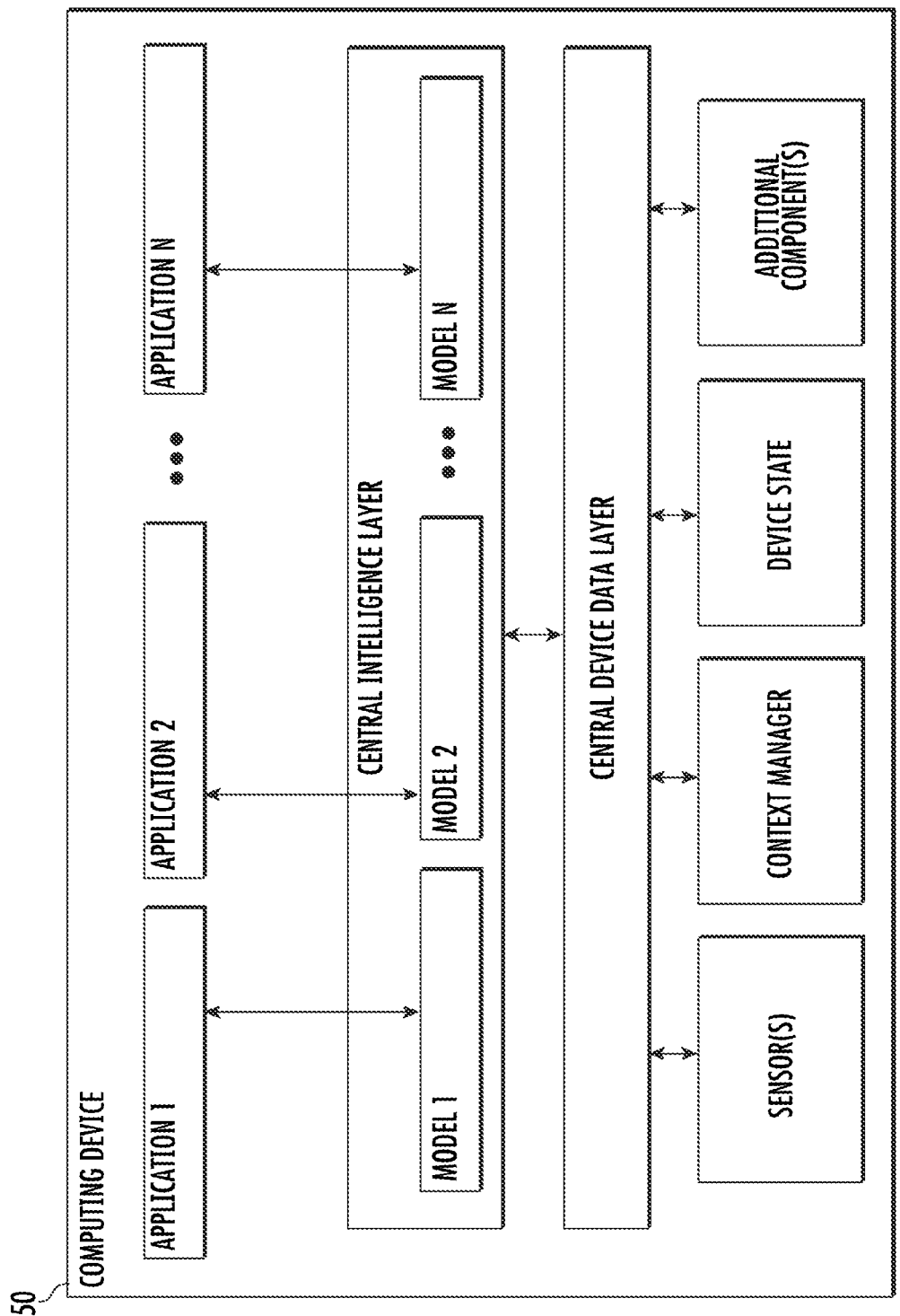
FIG. 1C depicts a block diagram of an example computing device that performs object recognition and filtering according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2A:
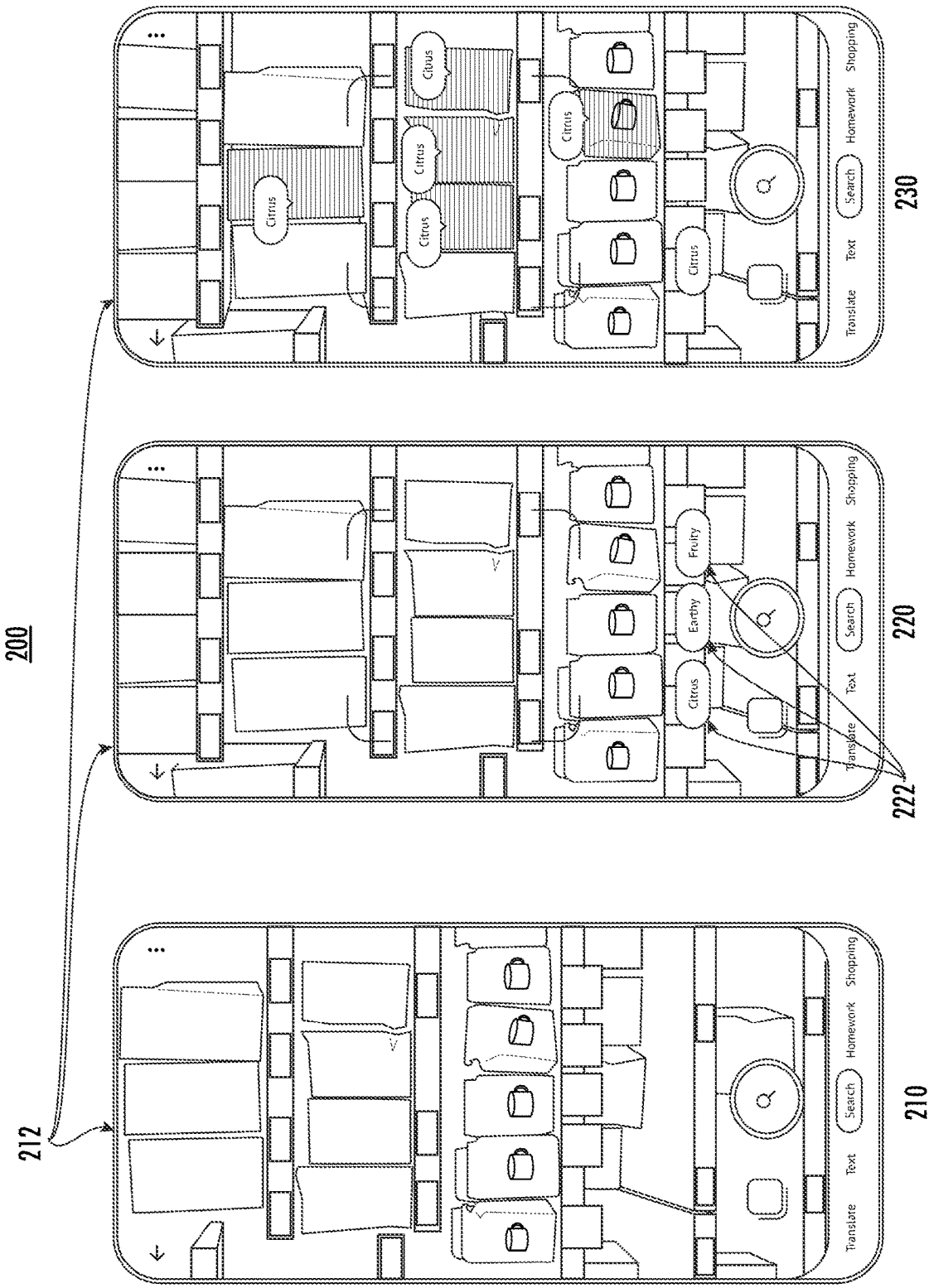
FIG. 2A depicts an illustration of an example object filtering and information display system according to example embodiments of the present disclosure.
Figure 2B:
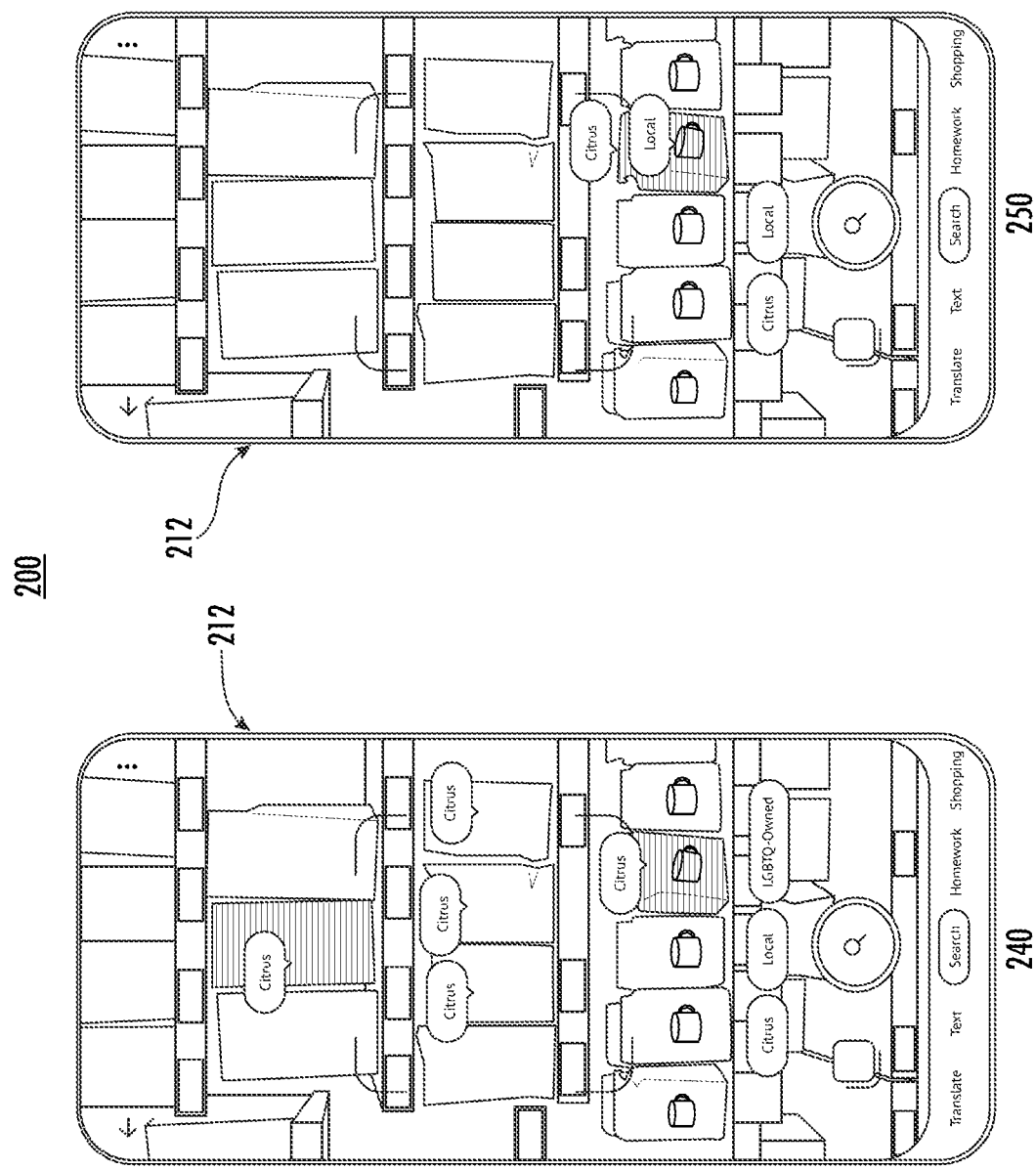
FIG. 2B depicts an illustration of an example object filtering and information display system according to example embodiments of the present disclosure.

FIGS. 2A & 2B depict an illustration of an example object filtering and information display system 200 according to example embodiments of the present disclosure. In some implementations, the object filtering and information display system 200 can include one or more machine-learned models trained to recognize objects in a captured image 210 descriptive of a scene and, as a result of object recognition, provide an augmented image 250 that includes one or more user-interface elements superimposed over objects meeting the filtering criteria. Thus, in some implementations, the object filtering and information display system 200 can include an intermediate augmented image 230 that is operable to indicate objects in the scene that meet a first criteria.

As depicted in FIGS. 2A & 2B, the systems and methods disclosed herein can be provided as a native application, a mobile application, and/or a web application being run on a mobile computing device 212. The mobile computing device 212 can include one or more stored and/or downloaded machine-learned models for image processing to determine the plurality of tags 222. The mobile computing device 212 can include one or more processors and can be configured to provide the user interface disclosed herein. For example, the mobile computing device 212 can include a display screen configured to display the user interface, which can include displaying one or more images captured by an image sensor (e.g., an image capture device of the mobile computing device). Alternatively and/or additionally, the systems and methods disclosed herein can be implemented into smart wearables (e.g., smart glasses).

In particular, the user can open a mobile device application that can be used to capture one or more images 210 of a scene (e.g., a grocery store aisle that includes a plurality of coffee options to choose from). The image can be processed to determine a plurality of different coffees are in the scene and that the scene is predominately objects of a coffee class. Based on the recognition of the plurality of coffees and/or based on the determined coffee class, the object filtering and information display system 200 can generate a plurality of tags 222 associated with flavor profiles for different coffees and can provide the tags 222 (e.g., citrus, earthy, and fruity) for display 220. A user can then select a particular tag (e.g., citrus). The object filtering and information display system 200 can obtain object-specific information for each of the coffees in the scene to determine which coffees have the flavor profile associated with the selected particular tag. The objects (i.e., the coffees) that have the specific flavor profile (i.e., citrus) can then be indicated inside the user interface 230. The indication can include one or more user-interface elements overlaid over the specific objects and/or may include highlighting the specific objects and dimming the surrounding areas.

The object filtering and information display system 200 may then determine one or more new tags (e.g., local and LGBTQ-owned) while continuing to provide the selected tag for display 240. A user can then select a second tag (e.g., local). The object filtering and information display system 200 can determine which of the objects meet the first criteria of the first tag and the second criteria of the second tag. The one or more objects that meet both criteria can then be indicated with one or more user-interface elements and may be highlighted 250.

In some implementations, the indicators and highlighting can occur on live-stream image data that can differ from the image data originally processed. For example, the annotations, tags, and user-interface elements can be provided as part of an augmented-reality experience that anchors user-interface elements and effects to objects in a scene such that as the camera moves, the user-interface element can stay with the associated object.

Figure 3B:
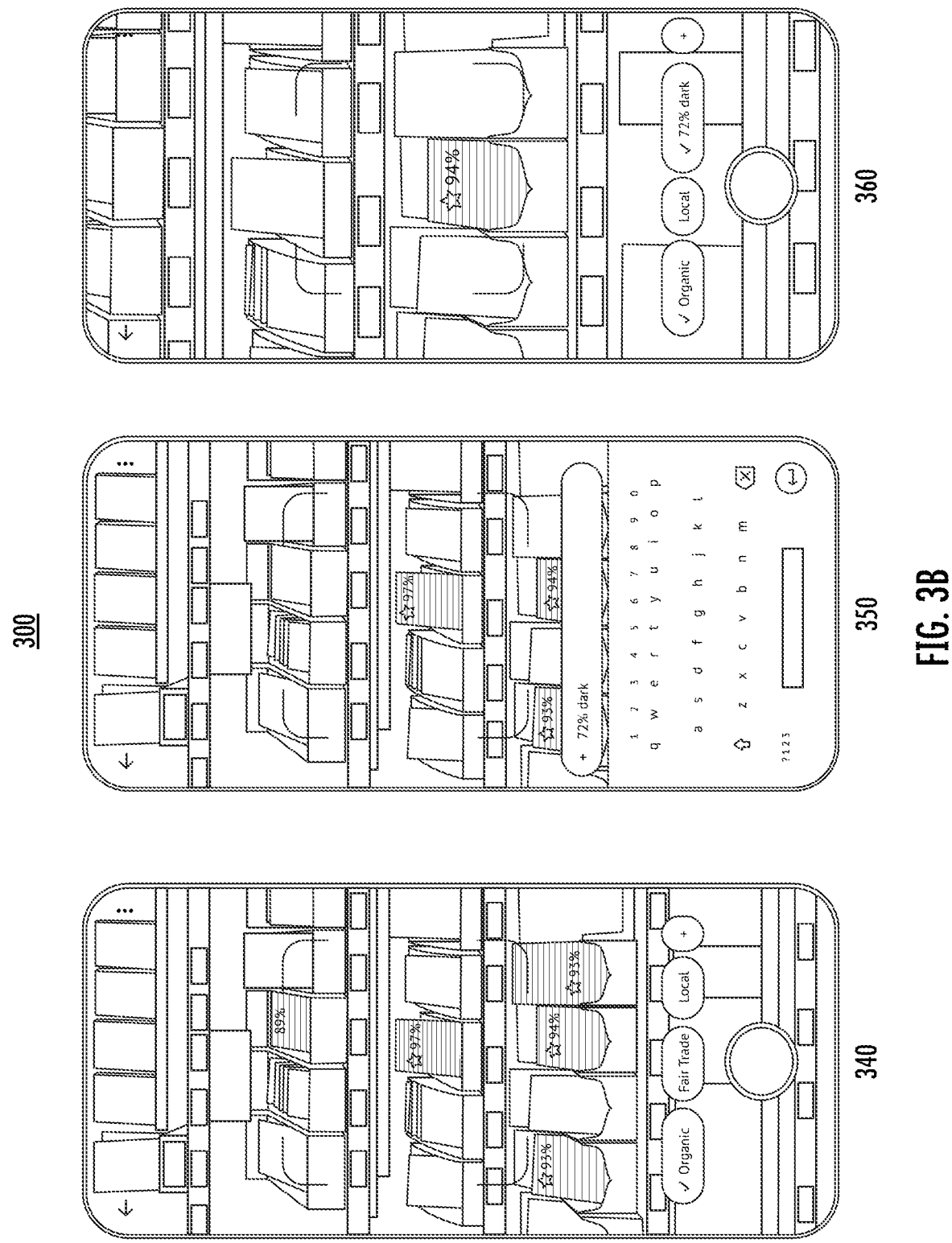
FIG. 3B depicts an illustration of an example object filtering and information display system according to example embodiments of the present disclosure.

FIGS. 3A & 3B depict an illustration of an example object filtering and information display system 300 according to example embodiments of the present disclosure. The object filtering and information display system 300 is similar to object filtering and information display system 200 of FIGS. 2A & 2B, further including text input.

In particular, the object filtering and information display system 300 can capture one or more images of a scene 310 (e.g., a grocery aisle that includes a plurality of different objects (e.g., different chocolates)). The one or more images can be processed to recognize the plurality of objects. Object-specific information (e.g., the rating for the particular chocolate) for each of the plurality of objects can then be obtained. Text associated with object-specific information can then be superimposed over the respective objects 320. Additionally and/or alternatively, a plurality of tags (e.g., fair trade, organic, and local) can be determined based on the recognized objects, the object class of the objects, and/or context data (e.g., location, user profile, etc.). The plurality of tags can be provided for display and a particular tag (e.g., fair trade) can be selected 330. The object filtering and information display system 300 can determine the objects associated with the particular tag and can indicate the objects that do or do not have an association with the tag (e.g., whether the object was produced and sold with fair trade). A checkmark can then be provided adjacent to the text of the selected tag. A user can then select a second tag, such as a text input tag to open a text input interface to generate a new tag 340. The text input interface can include a graphical keyboard, and the user can input a new filter or candidate query 350 (e.g., 72% dark). The input text can then be searched along with the recognized objects to determine which of the objects are associated with the particular text input. The objects that meet the criteria of the first tag and associated with the text input can then be indicated in the user interface via a spotlight feature 360.

FIGS. 4A & 4B depict an illustration of an example object filtering and information display system according to example embodiments of the present disclosure. The object filtering and information display system 400 is similar to the object filtering and information display system 200 of FIGS. 2A & 2B and the object filtering and information display system 300 of FIGS. 3A & 3B.

For example, one or more images can be obtained and processed. In some implementations, a processing interface effect can be provided 410 as the one or more images are processed. A plurality of objects in the scene can be recognized, and ratings for each of the objects can be obtained. Additionally and/or alternatively, a plurality of tags can be determined based on the images and/or context data. The user interface can then provide the ratings superimposed over the respective objects with the tags provided for selection at the bottom of the interface 420. A tag can be selected and the objects can be filtered to determine the specific objects that meet a particular criteria. The specific objects can then be indicated by removing the ratings from the objects that do not meet the criteria 430. A second tag can be selected, and a second filtering can occur. The user interface can be updated to remove ratings from the objects that do not meet the first criteria and the second criteria 440. A third tag can be selected, and a third filtering can occur. The user interface can be updated to remove ratings from the objects that do not meet the first criteria, the second criteria, and the third criteria 440.

In some implementations, determining an object meets a certain criterion can involve obtaining object-specific information for the particular object, parsing the information into one or more segments, processing the segments to determine the particular segments classification (e.g., the segment relates to flavor, ingredients, source, location, etc.). The systems and methods disclosed herein can then process the segments and the given criteria to determine whether there is an association. The processing can involve natural language processing and can involve determining based on one or more knowledge graphs whether one or more segments are associated with the given criteria (e.g., does the segment include language matching or describing the given criteria (e.g., the segment states "citrus" or a synonym of citrus, and the criteria is an item with a citrus flavor).

Alternatively and/or additionally, the object-specific information can include indexed data that is pre-structured into one or more information categories (e.g., ratings, calories, flavors, uses, ingredients, emissions, etc.). The object-specific information can then be crawled when checking for key words or information associated with a selected tag.

In some implementations, the objects may be associated with particular tags before the tags are provided for display. For example, the plurality of objects may be identified, and a plurality of respective object-specific information sets can be obtained. The object-specific information sets can be parsed and processed to generate profile sets for each object. The profile sets can be compared against one another to determine differentiating attributes between objects. The differentiating attributes can be utilized to generate tags that narrow down the list of objects. The objects with the particular differentiating attribute can be pre-associated with the tag such that once the tag is presented and selected, the systems and methods can automatically highlight or indicate the specific objects that are associated with that particular tag.

Additionally and/or alternatively, the object-specific information can include one or more predetermined tags indexed in a database and/or knowledge graph. In response to obtaining the object-specific information, the systems and methods can determine what tags are universal to all objects in the scene and prune those tags. The remaining predetermined tags can be provided for display and selection. Once a tag is selected, the systems and methods can then indicate each of the objects that include an indexed reference to the particular pre-determined tag.

In some implementations, the one or more tags can be selected as to not obfuscate the user experience. The one or more tags can be based on search queries by other users when searching a given object class or a particular object. In some implementations, the systems and methods can store and retrieve data related to an initial search and a final search associated with particular objects and particular object classes. Additionally and/or alternatively, search query data of a specific user or a plurality of users can be indexed with the location of the user at the time of the given query or filter. The data can then be utilized to determine a tag for the particular user or other users. The one or more tags can be generated to predict what a user may wish to know about a scene, environment, and/or object. The systems and methods can generate the tags based on what a user should search to reach a final action (e.g., a purchase selection, a do-it-yourself step, etc.).

Figure 5A:
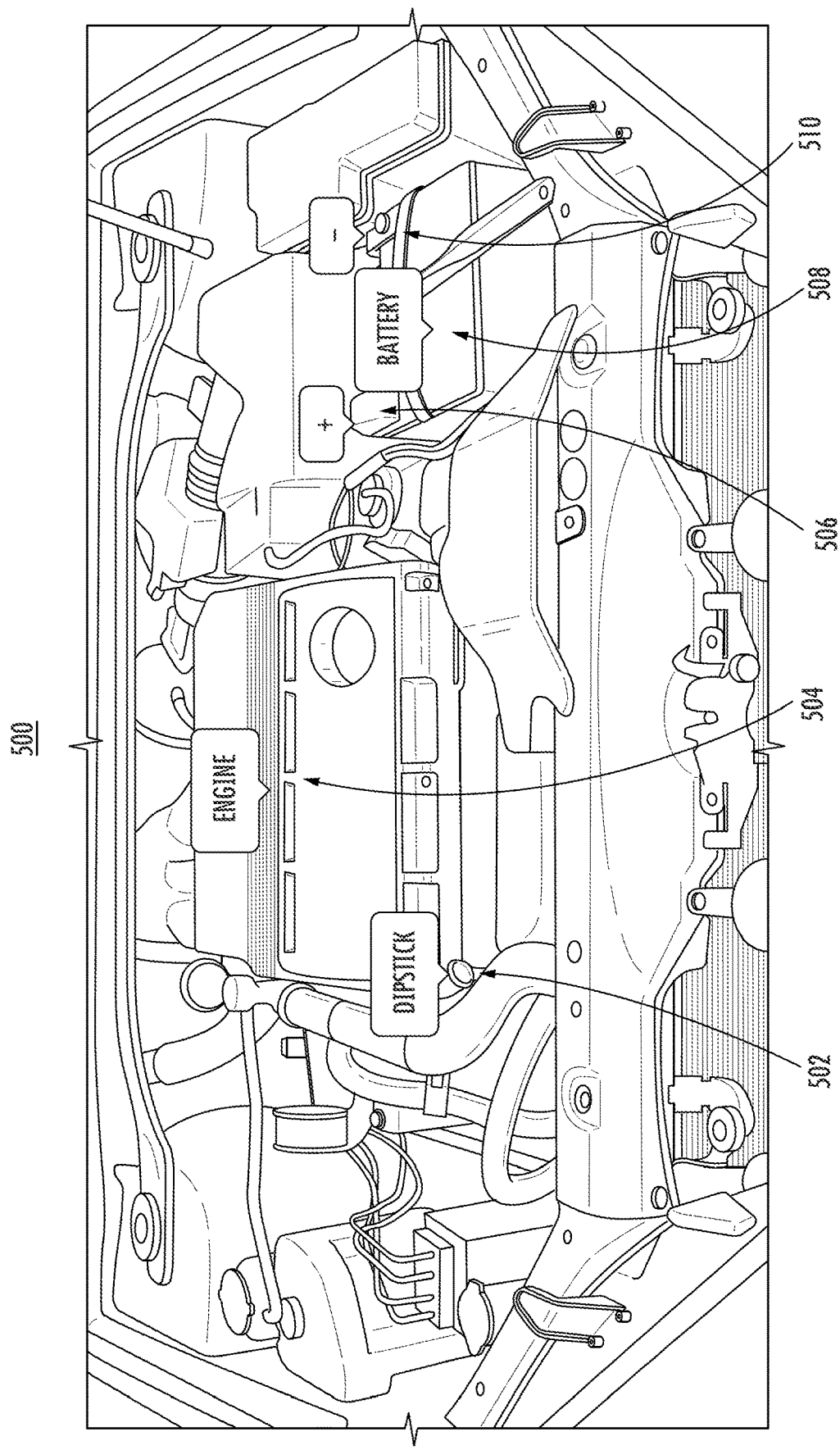
FIG. 5A depicts an illustration of an example ask and answer interaction according to example embodiments of the present disclosure.
Figure 5B:
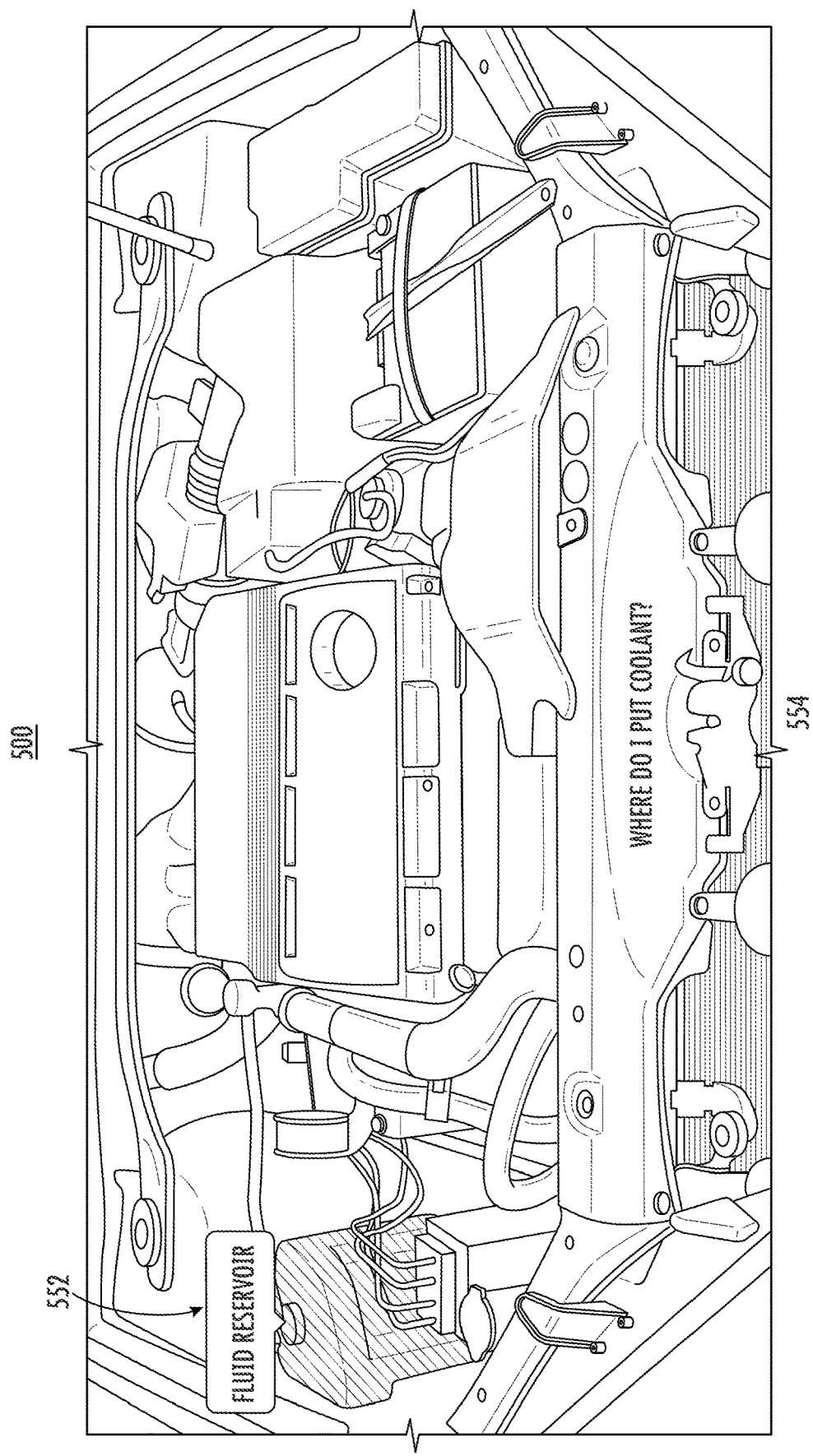
FIG. 5B depicts an illustration of an example ask and answer interaction according to example embodiments of the present disclosure.

FIGS. 5A & 5B depict an illustration of an example ask and answer interaction according to example embodiments of the present disclosure. In particular, image data can be obtained. The image data can be processed to determine the image data is descriptive of an engine compartment of a car. The different parts of the car can be identified and annotated in an augmented-reality interface 500. For example, the dipstick 502, the engine 504, and the battery 508 can be identified. Additionally and/or alternatively, the positive port 506+ and the negative port 510 of the battery can be annotated. An input descriptive of a question 554 can be received. The question 554 may be determined and provided for display in the augmented-reality interface 500. A response to the question 554 can then be determined. The response can include an annotation 552 of an object in the scene that is associated with an answer to the question.

In some implementations, the ask and answer interaction can be utilized for do it yourself projects (e.g., car maintenance, home improvement, and/or daily activities). Alternatively and/or additionally, the ask and answer interaction can be utilized for answering questions about an environment the user is currently located in.

Figure 9:
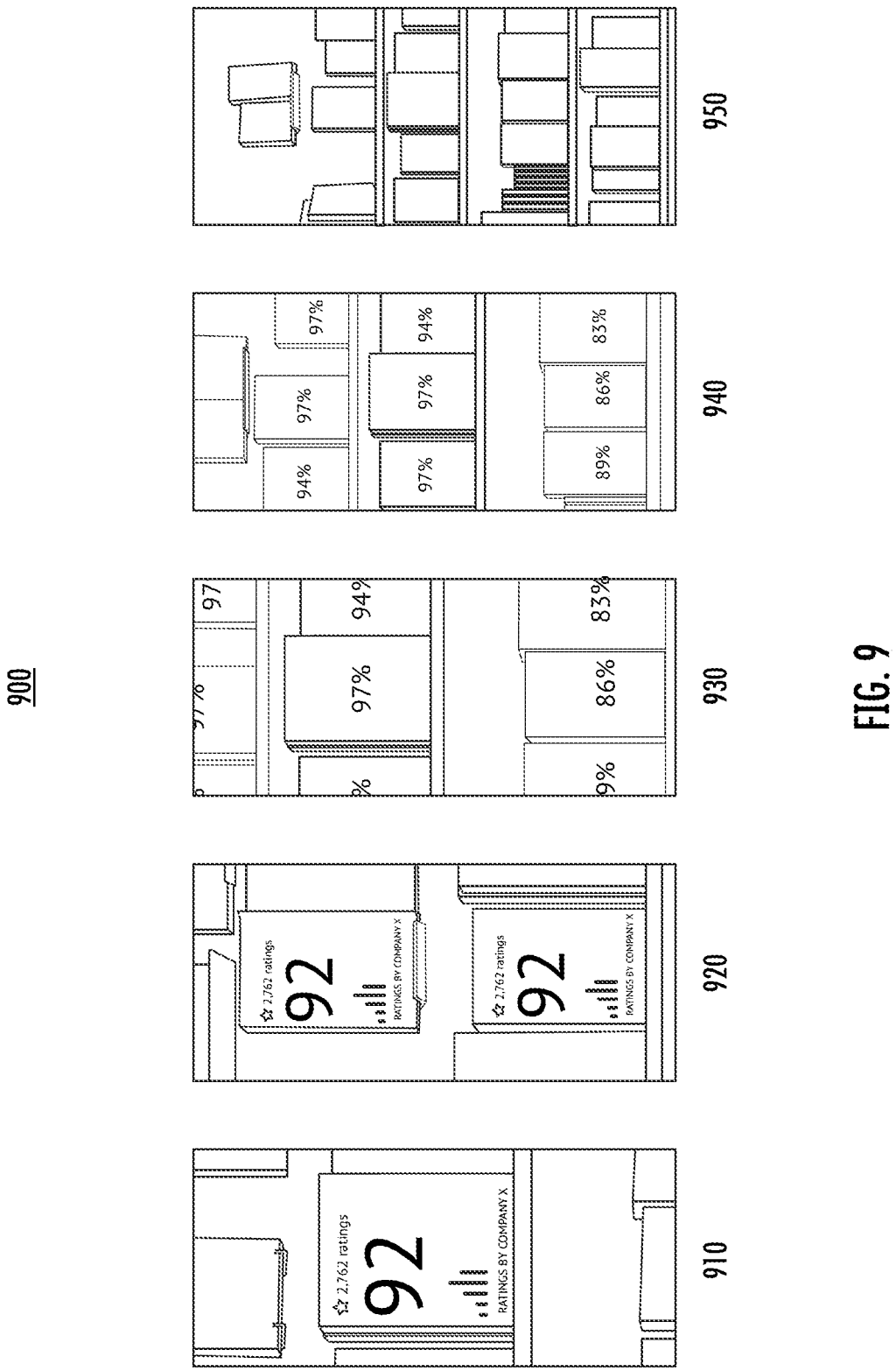
FIG. 9 depicts an illustration of an example zoom interaction according to example embodiments of the present disclosure.

FIG. 9 depicts an illustration of an example zoom interaction 900 according to example embodiments of the present disclosure. In particular, in some implementations, the systems and methods disclosed herein can provide increasingly more information as an object becomes a larger portion of the image (e.g., via zooming or via moving toward the object). In FIG. 9, a first instance 910 depicts a single book being fully displayed, and detailed information on the object is superimposed over the single book. A second instance 920 can depict two books being fully displayed, and detailed information on the objects can be superimposed over the respective books. A third instance 930 can depict four books being fully displayed; however, only the ratings may be superimposed over the respective books. A fourth instance 940 can depict nine books being fully displayed, and only the ratings may be superimposed over the respective books. A fifth instance 950 can include a large number of books being fully displayed. In response to the large number of books with relatively small portions of the image being utilized for each book, the user interface can remove the details until a zoom input is received or until a selection input is received. The zoom interaction interface can enable a user to receive increasingly more information on an object in an environment by zooming into an image.

Figure 10B:
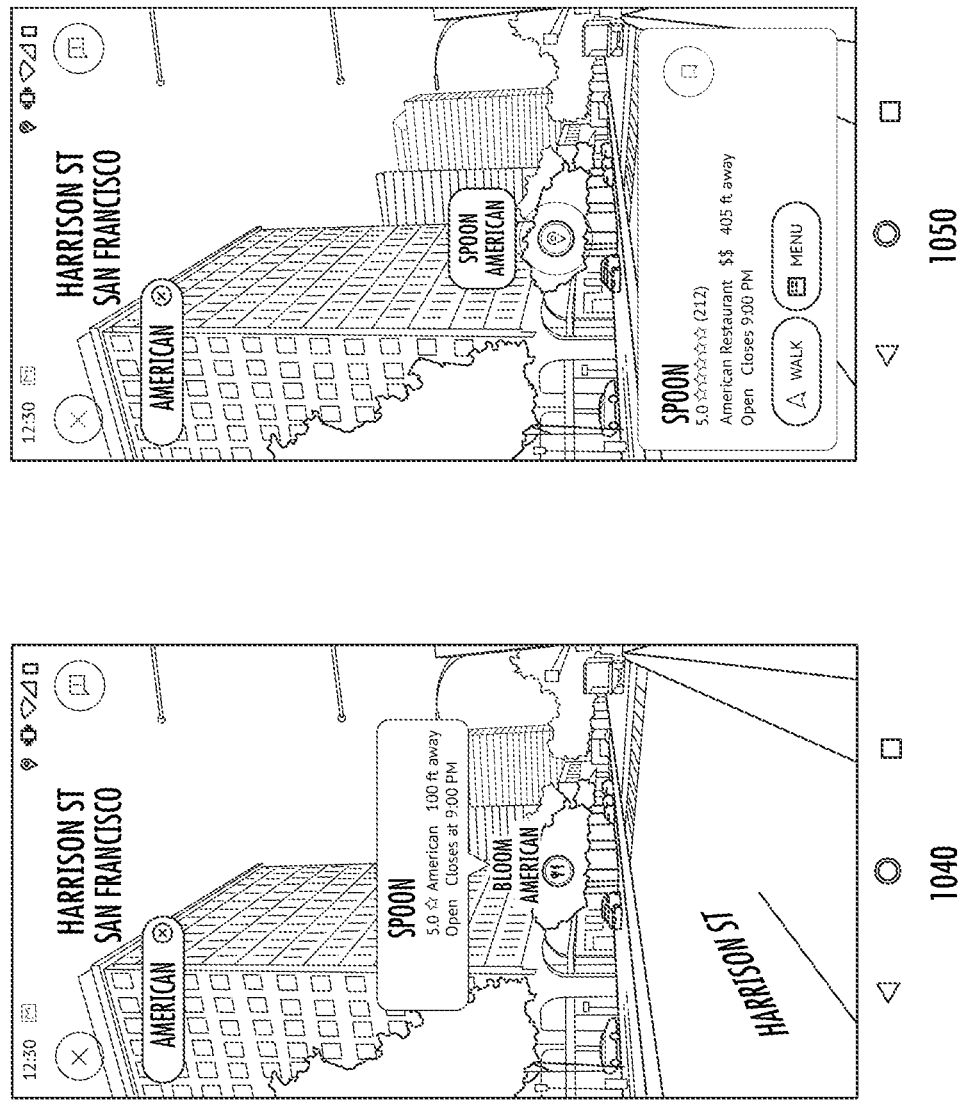
FIG. 10B depicts an illustration of an example mobile map application use according to example embodiments of the present disclosure.

FIGS. 10A & 10B depict an illustration of an example mobile map application use according to example embodiments of the present disclosure. In particular, the systems and methods disclosed herein can be implemented into a map application to allow a user to be informed of information associated with different locations. For example, a user can open a map application 1010 and can select an augmented-reality experience user-interface element (e.g., a "what's nearby" user-interface element) to open the augmented-reality experience. Image data can then be continually obtained from an image sensor. The image data can be processed to determine what stores, restaurants, landmarks, and/or monuments are depicted in the image data. One or more annotation user-interface elements can be generated for labeling the recognized locations. The recognized location data can be processed with a machine-learned model to determine one or more suggested tags to provide as user-interface elements that can narrow down the recognized locations (e.g., differentiator tags). The augmented-reality experience can include an initial interface 1020 with the image stream, a location indicator, and a plurality of tags (e.g., restaurants, coffee, shopping, etc.) for selection. The tags can be determined based on the processed image data, predetermined, determined based on the location, a plurality of user-interface elements (e.g., annotations (e.g., text and/or icons) for the depicted buildings and monuments) and/or determined based on a variety of other data. A selection of a particular tag (e.g., a restaurants tag) can be received and a first filtered interface 1030 can be provided that includes the image stream, the location indicator, and filtered annotations for buildings and monuments associated with the selected tag. New tags can be provided to further filter the identified buildings and monuments. The new tags can be determined by determining one or more differentiators between the remaining recognized locations.

A second tag (e.g., the American restaurant tag) can be selected, and a location (e.g., a building or monument) that is associated with the second tag. The second filtered interface 1040 can include the image stream, the location indicator, the selected second tag, the annotations for the determined location, and detailed information user-interface element (e.g., a bubble that can provide details on the location's name, rating, distance, and/or hours open). The location user-interface element(s) can be selected, and a directions prompting interface 1050 can be provided. The directions prompting interface 1050 can be interacted with to reopen the routing and directions portion of the map application with route information for getting to the location.

FIG. 11 depicts an illustration of an example book filtering based on ratings according to example embodiments of the present disclosure. As depicted, an image capture interface 1110 can be opened and utilized to capture an image. The image can be processed to recognize the objects in the image. Object-specific information for the objects can be obtained and utilized to generate a plurality of respective user-interface elements for the plurality of objects. An annotation interface 1120 can be provided with the objects in the image being annotated with the plurality of respective user-interface elements. A particular object can be selected, and details bar interface 1130 can be provided. The details bar interface 1130 can include the particular object being indicated with the surrounding portions of the image being dimmed. Additionally and/or alternatively, the other user-interface elements can be moved to the borders of the interface, and a details bar can be provided at the bottom of the interface. The details bar can include more detailed information on the particular object, may include a selectable element for transitioning to a search application, and may be configured such that a swipe up can expand the details bar.

FIG. 12 depicts an illustration of an example object-specific information display according to example embodiments of the present disclosure. In particular, a plurality of images can be obtained associated with a plurality of different, respective objects. The plurality of images may be generated by segmenting different portions of one or more original images to segment the different objects into different images. Alternatively and/or additionally, the plurality of images may be generated separately with one or more image sensors.

In some implementations, the plurality of images may be selected from a set of images. A user may select a plurality of images for processing via a selection interface 1210 that displays thumbnails for a set of images. The selected images can be processed to recognize the objects in the images, and object-specific information associated with the objects can be obtained for each object. An object-specific details interface can then be provided that can display a first details panel 1220 associated with the object of a first image. In some implementations, the object-specific details interface can include a carousel of thumbnails with ratings indicators associated with the plurality of objects in the plurality of images. The thumbnails can be selected, which can then cause the associated image to be displayed with information on the object in the associated image. For example, the second thumbnail can be selected, and a second details panel 1230 can be provided while displaying the carousel and the second image. Alternatively and/or additionally, the images can be navigated through via a swipe gesture and/or a variety of other inputs. In some implementations, the interface can include an automatic navigation that displays each image and details panel for a given period of time.

Figure 13:
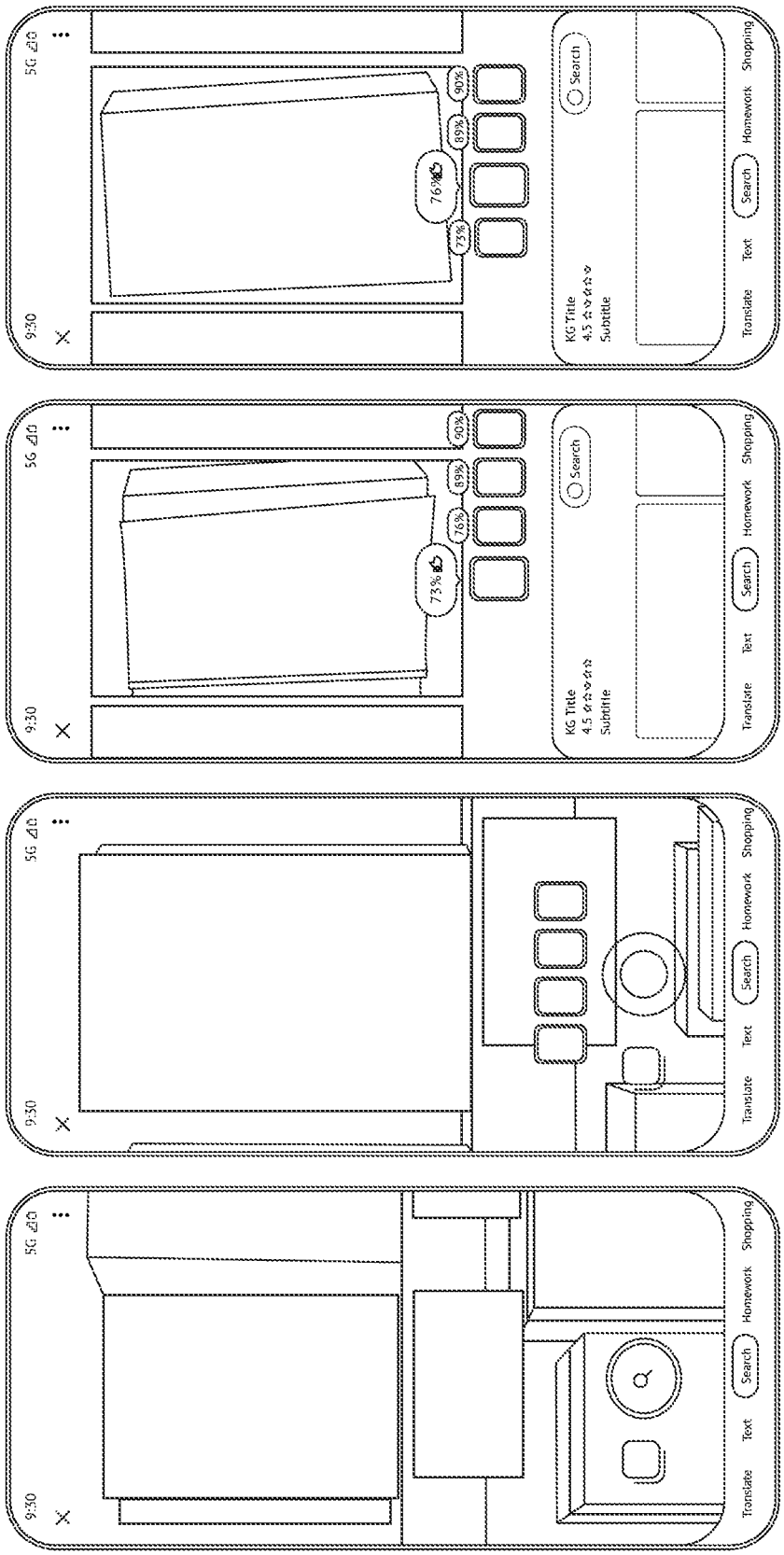
FIG. 13 depicts an illustration of an example object-specific information display according to example embodiments of the present disclosure.

FIG. 13 depicts an illustration of an example object-specific information display according to example embodiments of the present disclosure. FIG. 13 can utilize a similar user interface to FIG. 12. In some implementations, a user can capture a panoramic image and/or a video that depicts a plurality of objects. The panoramic image and/or the video can be processed to detect objects. The objects can then be segmented from the input data to generate a plurality of image frames associated with the plurality of objects. For example, a panoramic image can begin with a first object 1310 and end with a fourth object 1320. The panoramic image can be segmented into four image frames associated with the four objects. The objects can be recognized, and object-specific information can then be obtained for each of the objects. The object-specific information and the image frames can then be utilized to provide detailed information on the objects via the object-specific details interface. The object-specific details interface can include a first details panel 1330 for a first object, a second details panel 1340 for a second object, a third details panel for a third object, and a fourth details panel for a fourth object.

FIG. 14 depicts an illustration of an example book filtering based on ratings according to example embodiments of the present disclosure. In particular, an image can be obtained via an image capture interface 1410. The image can be utilized as an image query, and a plurality of objects (e.g., books) can be recognized. Object-specific information (e.g., ratings) for the plurality of objects can be obtained. A suggestions interface 1420 can be provided that provides at least a portion of the object-specific information superimposed over the respective objects. A shutter user-interface element (e.g., a shutter button) can be selected. The systems and methods can determine the focal point of the image and provide more detailed information on an object in a focal region of the image via an answer interface 1430. In some implementations, the focal object can be indicated via a refined reticle. The focal region can be a central region, a region in a reticle, a region selected via a user input, a region of a determined user gaze, and/or a region determined to be a focal point of a scene. In some implementations, the focal point objects may be annotated, and the objects outside of the focal point may be left unannotated (however, the unannotated objects may be detected, processed, and recognized with object details determined to be displayed once the object enters the focal point).

FIG. 15 depicts an illustration of example object-specific search user interfaces according to example embodiments of the present disclosure. The systems and methods disclosed herein can include a variety of user interface display alternatives for the object-specific details interface that can include object-specific detail panels based on a user selection. For example, a selected object can be indicated with a user-interface element for each respective recognized object in the image. A first interface 1510 can include a bubble user-interface element with text information above the selected object, and text information user-interface elements superimposed over the respective other objects. A second interface 1520 can include a bubble user-interface element with text information above the selected object, and text information user-interface elements for the respective other objects on the peripheral of the user interface. A third interface 1530 can include a bubble user-interface element with text information above the selected object, and undescriptive user-interface elements superimposed over the respective other objects.

Figure 16:
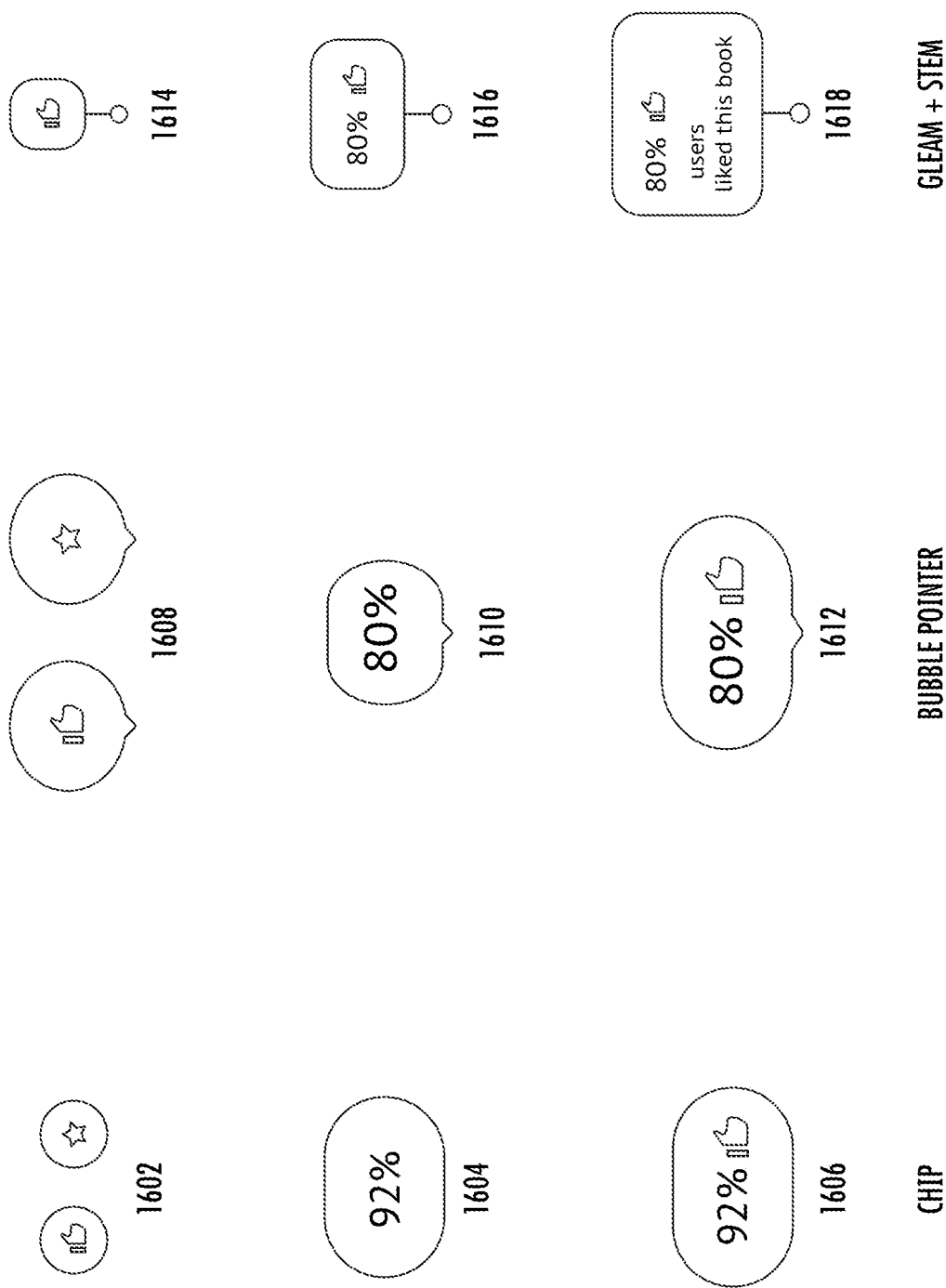
FIG. 16 depicts an illustration of example user-interface elements according to example embodiments of the present disclosure.

FIG. 16 depicts an illustration of example user-interface elements according to example embodiments of the present disclosure. The systems and methods can utilize a variety of different user-interface elements. In particular, the user-interface elements can include user-interface elements with just icons, user-interface elements with just text (e.g., 1602, 1608, and 1614), user-interface elements with text and icons (e.g., 1616, 1606, and 1612), and user-interface elements with text of different styles and sizes (e.g., 1618). The user-interface elements can have different sizes and shapes. Additionally and/or alternatively, the user-interface elements may have a point, a stem, or another indicator of the particular associated object.

FIG. 17 depicts an illustration of example user-interface elements according to example embodiments of the present disclosure. In FIG. 17, the first user interface 1710 includes a plurality of recognized objects that are annotated with ratings. A user can select a tag request icon to obtain a filter interface 1720 that can be interacted with to filter the annotations to just annotations of objects meeting a given criteria (e.g., objects with a rating above a certain threshold). A second set of tags can then be determined and provided for selection (e.g., tags associated with genres of particular objects in the scene). One or more tags can be selected to provide a third interface 1730 that can be descriptive of annotations superimposed over only objects meeting the two criteria.

Figure 18:
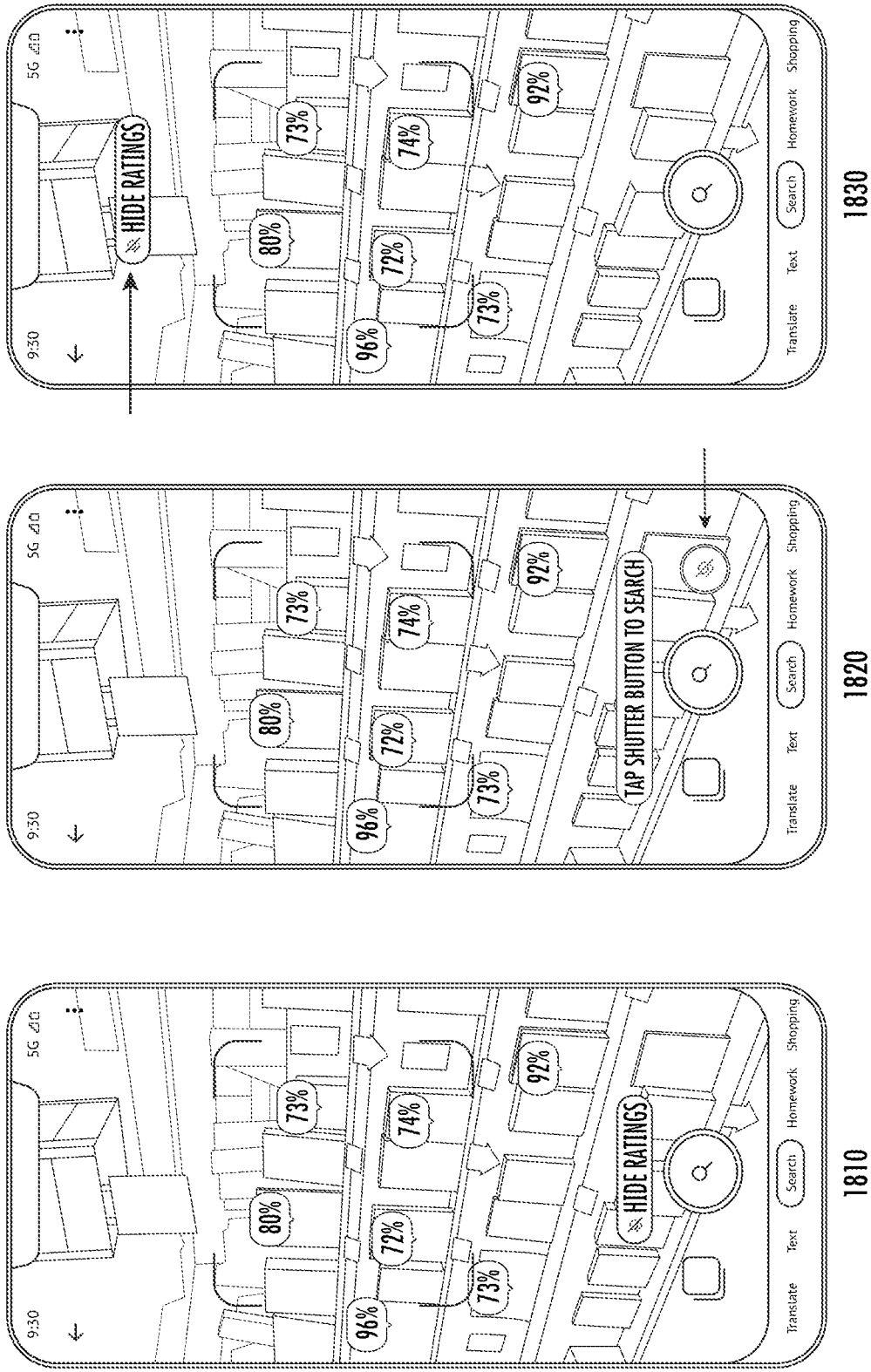
FIG. 18 depicts an illustration of example user-interface elements according to example embodiments of the present disclosure.

FIG. 18 depicts an illustration of example user-interface elements according to example embodiments of the present disclosure. In some implementations, the systems and methods can include a selectable user-interface element (e.g., a button) for hiding the annotation user-interface elements. The hide button can be provided at the bottom 1810 of a user interface, in the corner 1820 of a user interface, or at the top 1830 of a user interface.

Figure 19:
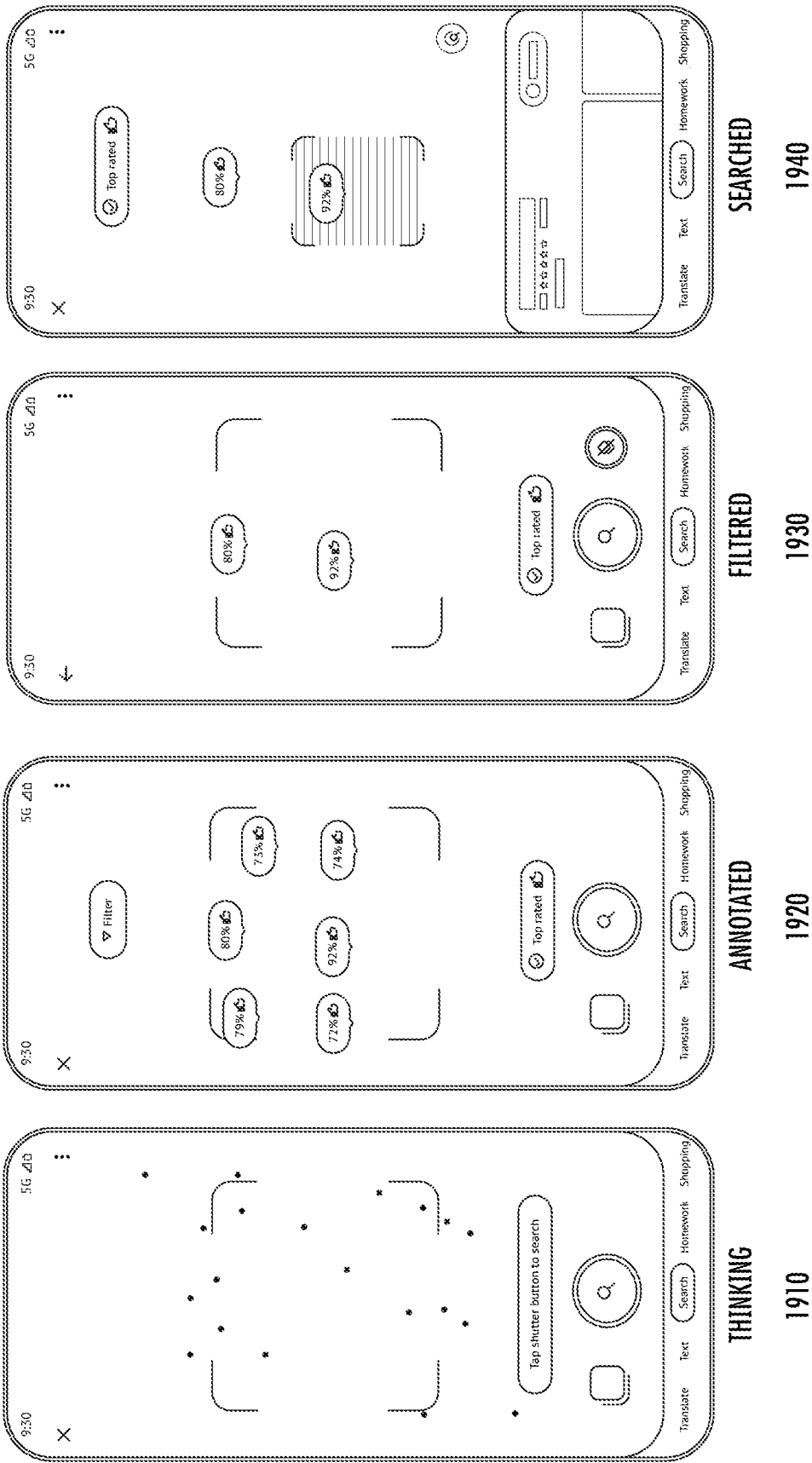
FIG. 19 depicts an illustration of an example user interface transition according to example embodiments of the present disclosure.

FIG. 19 depicts an illustration of an example user interface transition according to example embodiments of the present disclosure. The user interface transition can include a thinking stage 1910 that can indicate the image is being processed. Next, the user interface transition can include an annotated stage 1920 that overlays annotation user-interface elements overlaid over recognized objects. A filter can then be selected, and a filtered stage 1930 can be provided with the annotation user-interface elements limited to objects that are associated with the selected filter. An annotation user-interface element can be selected, and a searched stage 1940 can be provided for display. In the searched stage 1940, the region with the selected object can be highlighted with one or more visual effects. In some implementations, a details panel (e.g., a knowledge panel) can be provided for display and can be descriptive of information associated with the selected object.

Figure 20:
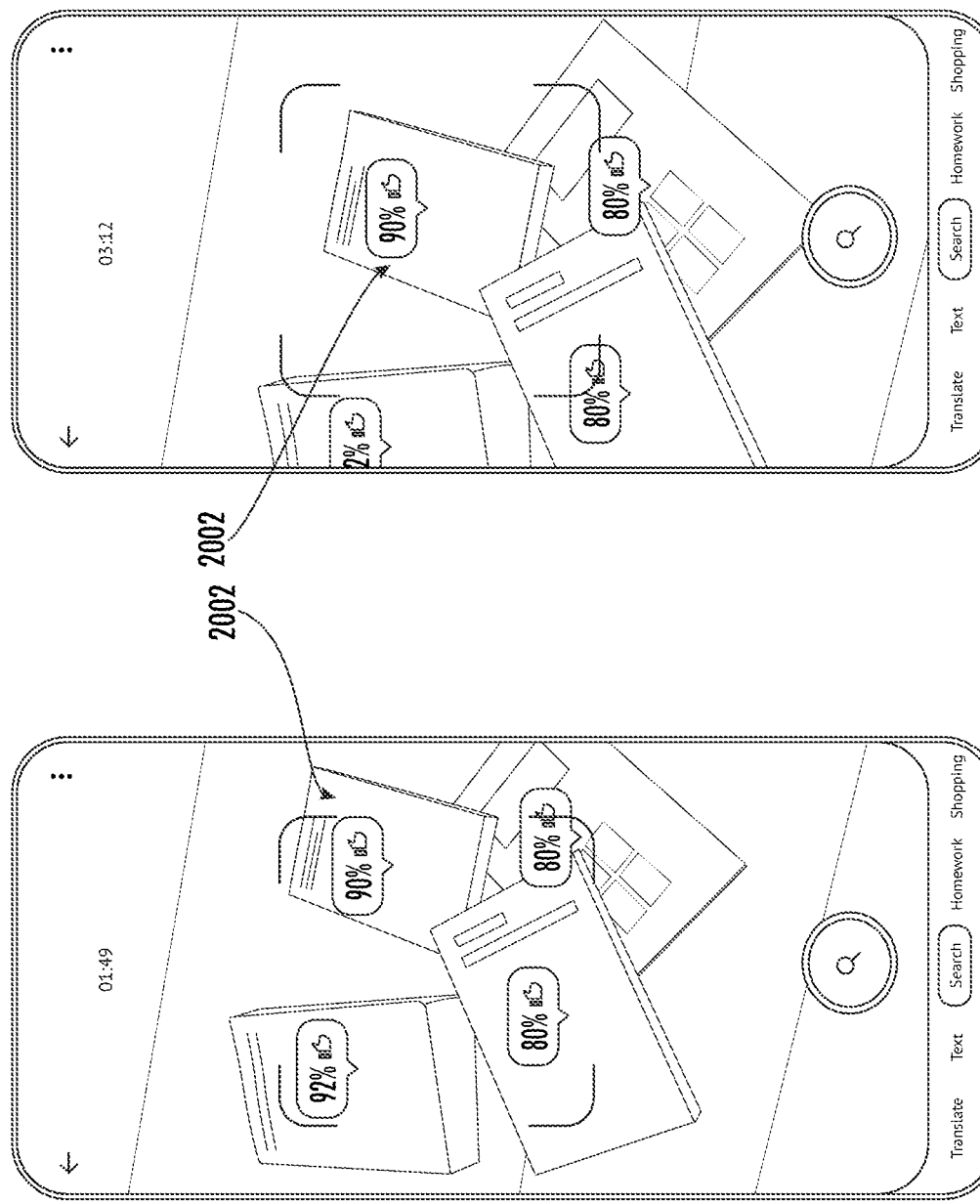
FIG. 20 depicts an illustration of an example focus interaction according to example embodiments of the present disclosure.

FIG. 20 depicts an illustration of an example focus interaction according to example embodiments of the present disclosure. In some implementations, the annotation user-interface elements can vary in appearance based on whether the object associated with the annotation is in the focal point of the camera interface. For example, a first stage 2010 can include all annotation user-interface elements being semi-transparent. At a second stage 2020, the camera interface can have a singular object 2002 in the reticle. The annotation user-interface element associated with the singular object 2002 can then be displayed as fully opaque.

FIG. 21 depicts an illustration of example user-interface elements according to example embodiments of the present disclosure. The annotation user-interface elements associated with the recognized objects can include one or more icons 2110, text and icons in a bubble 2120, and/or a bubble with multiple text sizes with more detailed information 2130 (e.g., the ratings for the objects and where the ratings are from). The different levels of information provided can be determined based on user preferences, one or more user selections, a number of objects being annotated, the amount of information available, a distance from the objects, and/or screen size.

In some implementations, the location and/or the size of the user interface element overlays may be determined and/or adjusted based on interface display availability. For example, the user interface element may be displayed higher up on an object than neighboring user interface elements in order to avoid overcrowding and/or element overlapping. Alternatively and/or additionally, the amount of information and/or the text size may be adjusted.

Figure 22:
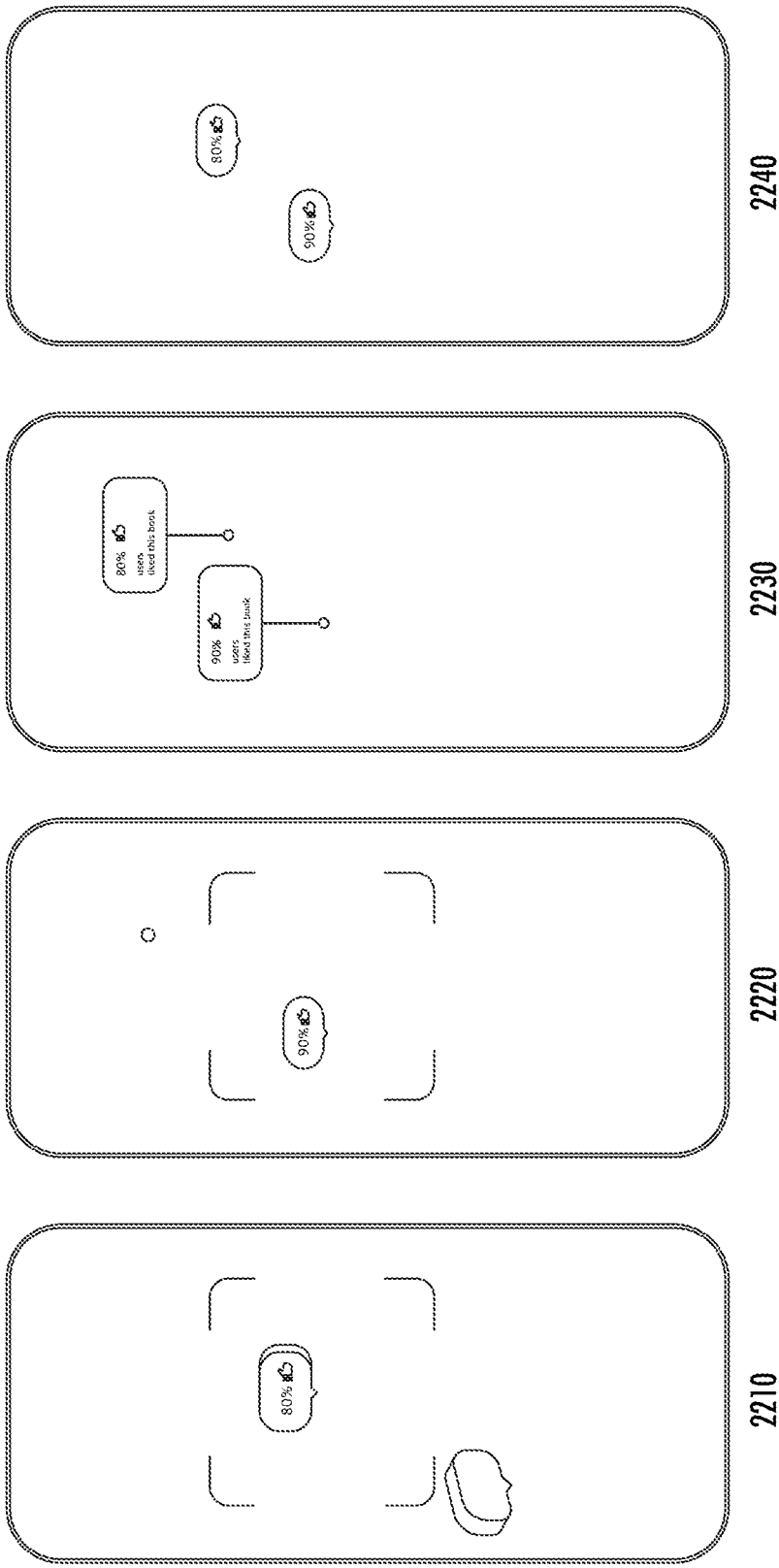
FIG. 22 depicts an illustration of example user-interface elements according to example embodiments of the present disclosure.

FIG. 22 depicts an illustration of example user-interface elements according to example embodiments of the present disclosure. The user-interface elements can include three-dimensional, dynamic elements 2210 that can rotate based on where the reticle is. Alternatively and/or additionally, the size, contents, and/or size of the user-interface elements can change based on where the reticle is. For example, at 2220, a dot can be displayed over objects in the scene, and the dot can expand to include a text bubble when the reticle hovers over the dot. At 2230 and 2240, the annotation user-interface elements can be provided above the objects in the augmented-reality experience instead of being superimposed over the objects.

Figure 23:
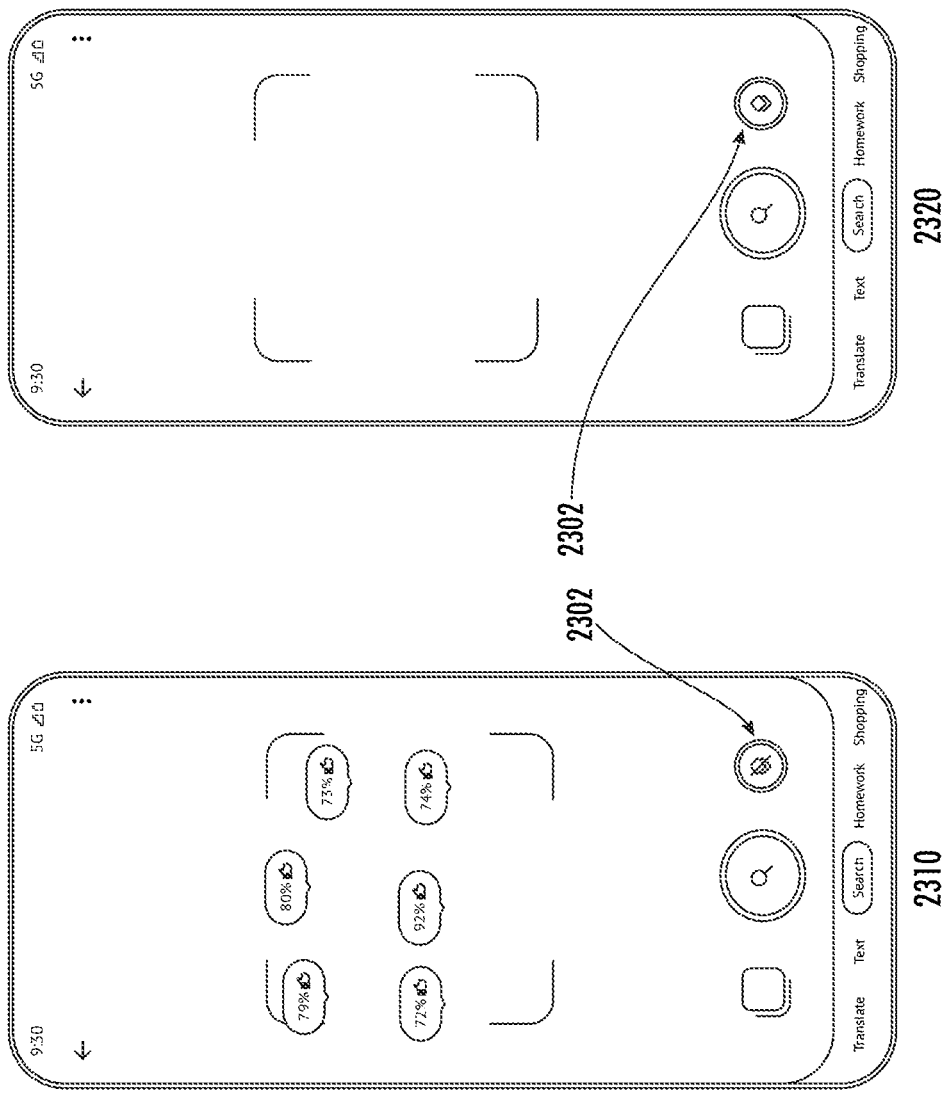
FIG. 23 depicts an illustration of an example toggle element for turning the object tagging on and off according to example embodiments of the present disclosure.

FIG. 23 depicts an illustration of an example toggle element 2302 for turning the object tagging on and off according to example embodiments of the present disclosure. In particular, a first interface 2310 can include a plurality of annotation user-interface elements indicating information for objects in the scene. The systems and methods can then receive a selection of the toggle element 2302, and a second interface 2320 can be provided with the annotation user-interface elements. Additionally and/or alternatively, the toggle element 2302 can be utilized to interchangeably switch between the first interface 2310 and the second interface 2320.

Figure 24:
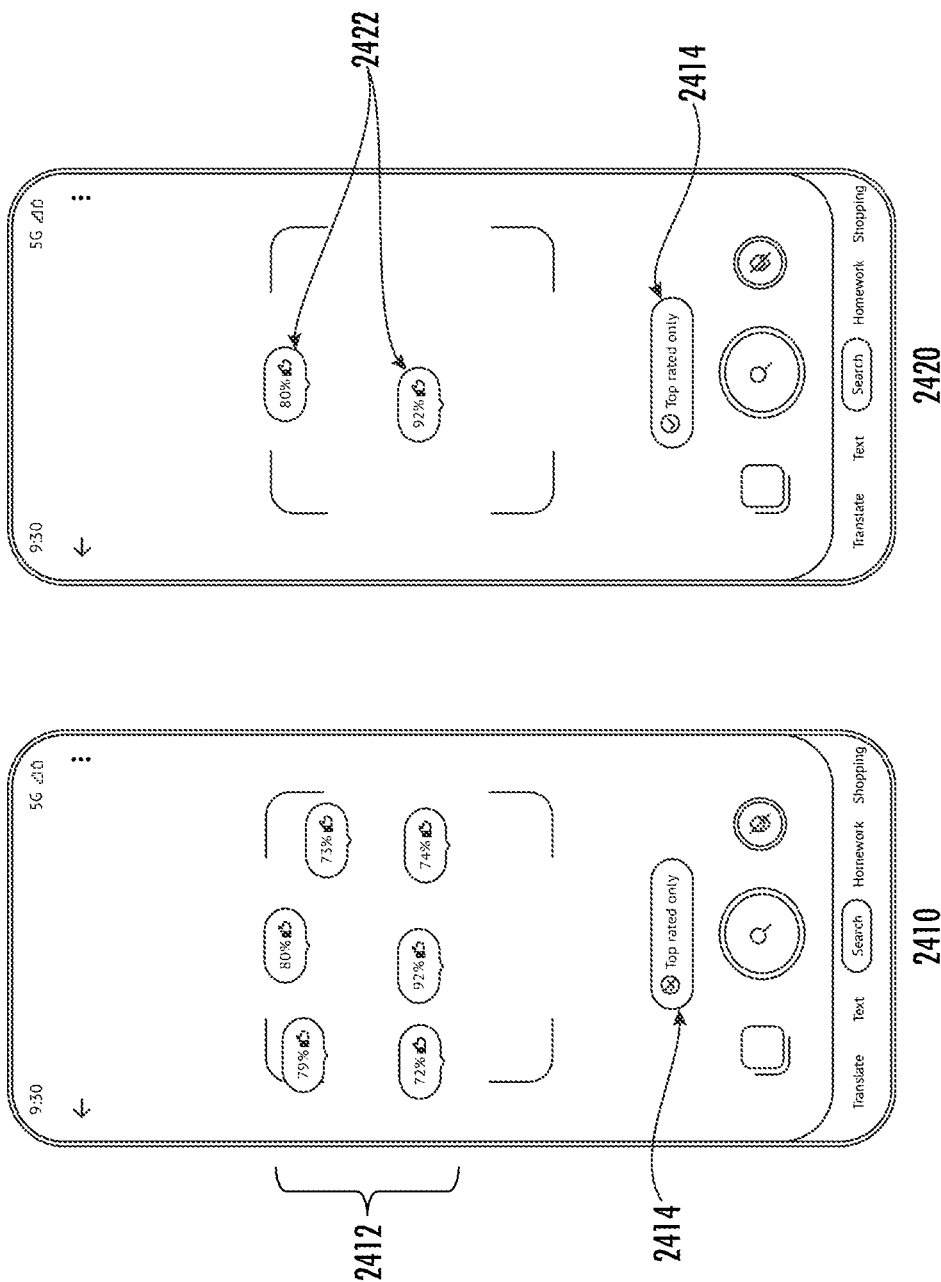
FIG. 24 depicts an illustration of an example rating filtering element for filtering based on ratings according to example embodiments of the present disclosure.

FIG. 24 depicts an illustration of an example rating filtering element for filtering based on ratings according to example embodiments of the present disclosure. At 2410, a plurality of annotation user-interface elements 2412 can be provided in response to objects in the scene being recognized. The systems and methods can then receive a selection of a filter tag 2414 (e.g., a top ratings only tag) and transition to 2420. At 2420, the annotation user-interface elements 2422 can include only user-interface elements associated with objects meeting the filtering criteria. The filter tag 2414 can be provided in a different color and/or with a different icon based on whether the filter tag 2414 has been selected, unselected, or deselected.

FIG. 25 depicts an illustration of an example rating filtering slider element for filtering based on ratings according to example embodiments of the present disclosure. In some implementations, the filtering can be based on an interaction with a filtering slider 2522. For example, at 2510, a plurality of annotation user-interface elements can be provided for display along with a filter tag 2512. The filter tag 2512 can be selected to open a filtering slider 2522. At 25209, a filtering slider 2522 has been interacted with to filter the annotation user-interface elements to only display a final user-interface element 2524 associated with an object that has a rating about 90%.

FIG. 26 depicts an illustration of an example search interface according to example embodiments of the present disclosure. In particular, the systems and methods disclosed herein can switch between a first interface 2610 and a second interface 2620 based on a search element selection. The first interface 2610 can include one or more out-of-reticle user-interface elements 2612 that are provided for display as semi-transparent and one or more in-focus user-interface elements 2614 that are provided as fully opaque to indicate the associated object is within a reticle. A search element can then be selected to transition to the second interface 2620 that provides a details panel associated with an object in focus (e.g., the object associated with the in-focus user-interface element 2614).

Figure 27:
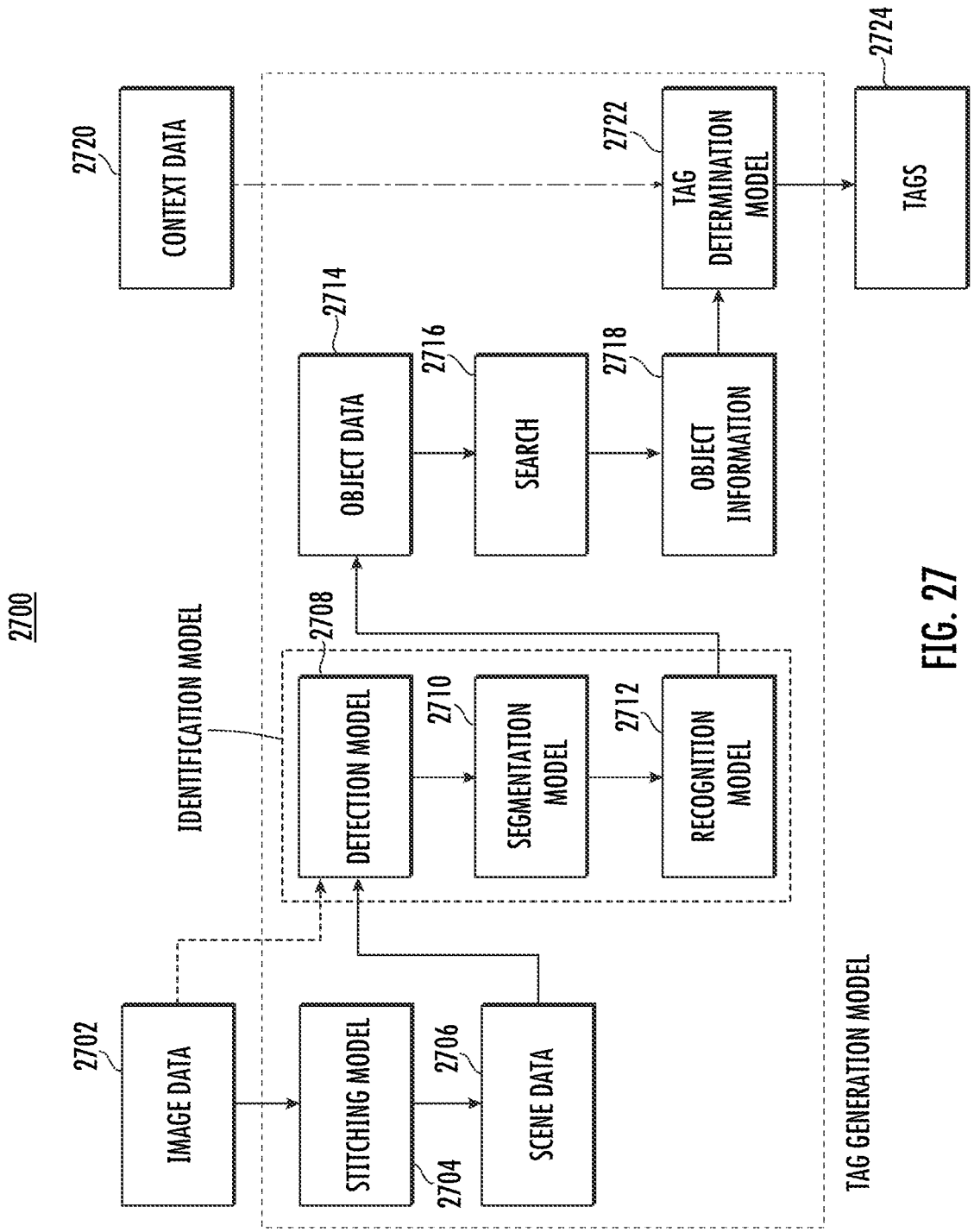
FIG. 27 depicts a block diagram of an example tag generation model according to example embodiments of the present disclosure.

FIG. 27 depicts a block diagram of an example tag generation model 2700 according to example embodiments of the present disclosure. The example tag generation model 2700 can include a plurality of machine-learned models and can include one or more deterministic functions. The tag generation model 2700 can be trained to receive image data 2702 (e.g., a plurality of image frames associated with a scene) and output one or more tags 2724 (e.g., filter tags and/or candidate query tags).

The image data 2702 can be processed by a stitching model 2704 to determine whether two or more image frames are descriptive of the same scene. If image frames are determined to be associated with the same scene, the stitching model can generate scene data 2706 descriptive of the image frames being stitched together. The scene data 2706 and/or the image data 2702 can be processed by an identification model to recognize and/or classify the object(s) in the scene and/or the image(s). The identification model can include a detection model 2708, a segmentation model 2710, and a recognition model 2712. The image data 2702 and/or the scene data 2706 can be processed by the detection model 2708 to generate bounding boxes around one or more objects detected in the scene. The bounding box(es) and the image data 2702 (and/or the scene data 2706) can be processed by the segmentation model 2710 to segment the portions of the images associated with the bounding box(es). The segmented portions of the images can be processed by the recognition model 2712 to identify each of the detected objects in order to generate object data 2714. The object data 2714 can then be utilized to search 2716 one or more databases for object-specific information 2718 for each identified object.

The object-specific information 2718 and/or the context data 2720 can then be processed by a tag determination model 2722 to generate one or more tags. The one or more tags can then be utilized to receive input from a user to provide more tailored data to a user.

Example Methods

Figure 6:
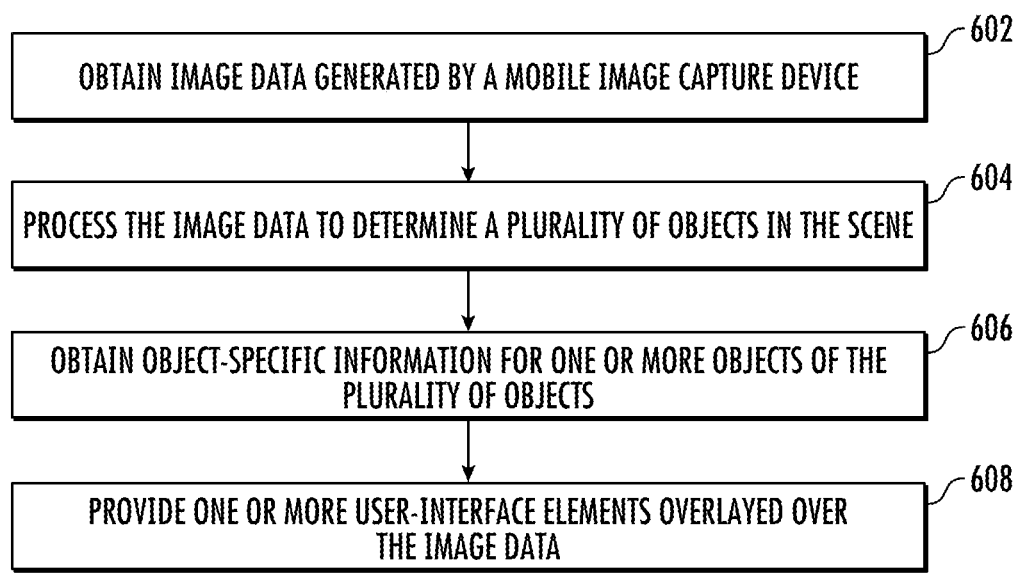
FIG. 6 depicts a flow chart diagram of an example method to perform object recognition and information display according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can obtain image data generated by a mobile image capture device. The image data can depict a scene.

At 604, the computing system can process the image data to determine a plurality of objects in the scene. The plurality of objects can include one or more consumer products.

At 606, the computing system can obtain object-specific information for one or more objects of the plurality of objects. The object-specific information can include one or more details associated with each of the one or more objects.

In some implementations, the computing system can obtain context data associated with a user and determine a query based on the image data and the context data. The object-specific information can be obtained based at least in part on the query. The context data can be descriptive of a user location, user preferences, past user queries, and/or user shopping history. For example, the context data can be descriptive of a user location. The computing system can obtain one or more popular queries associated with the user location. The query may be determined based at least in part on the one or more popular queries.

Alternatively and/or additionally, the computing system can determine an object class associated with the plurality of objects, and the object-specific information can be obtained based at least in part on the object class.

At 608, the computing system can provide one or more user-interface elements overlaid over the image data. The one or more user-interface elements can be descriptive of the object-specific information. In some implementations, the one or more user-interface elements can include a plurality of product attributes associated with specific objects in the scene.

In some implementations, the computing system can obtain input data associated with a selection of a particular user-interface element associated with a particular product attribute and provide one or more indicators overlaid over the image data. The one or more indicators can be descriptive of one or more particular objects associated with the one or more particular product attributes. In some implementations, the particular product attribute can include a threshold product rating, and the particular user-interface element may include a slider associated with a range of consumer product ratings. Additionally and/or alternatively, the plurality of product attributes can include a plurality of different product types.

Alternatively and/or additionally, the computing system can determine a plurality of filters associated with the plurality of objects. Each filter can include criteria associated with a subset of the plurality of objects. The computing system can provide the plurality of filters for display in a user interface. In some implementations, the computing system can obtain a filter selection associated with a particular filter of the plurality of filters and provide an augmented-reality overlay over one or more image frames. The augmented-reality overlay can include the one or more user-interface elements being provided over respective objects that meet the respective criteria of the particular filter.

In some implementations, the computing system can receive audio data. The audio data can be descriptive of a voice command. The computing system can determine a particular object associated with the voice command and provide an augmented image frame that indicates the particular object associated with the voice command.

Figure 7:
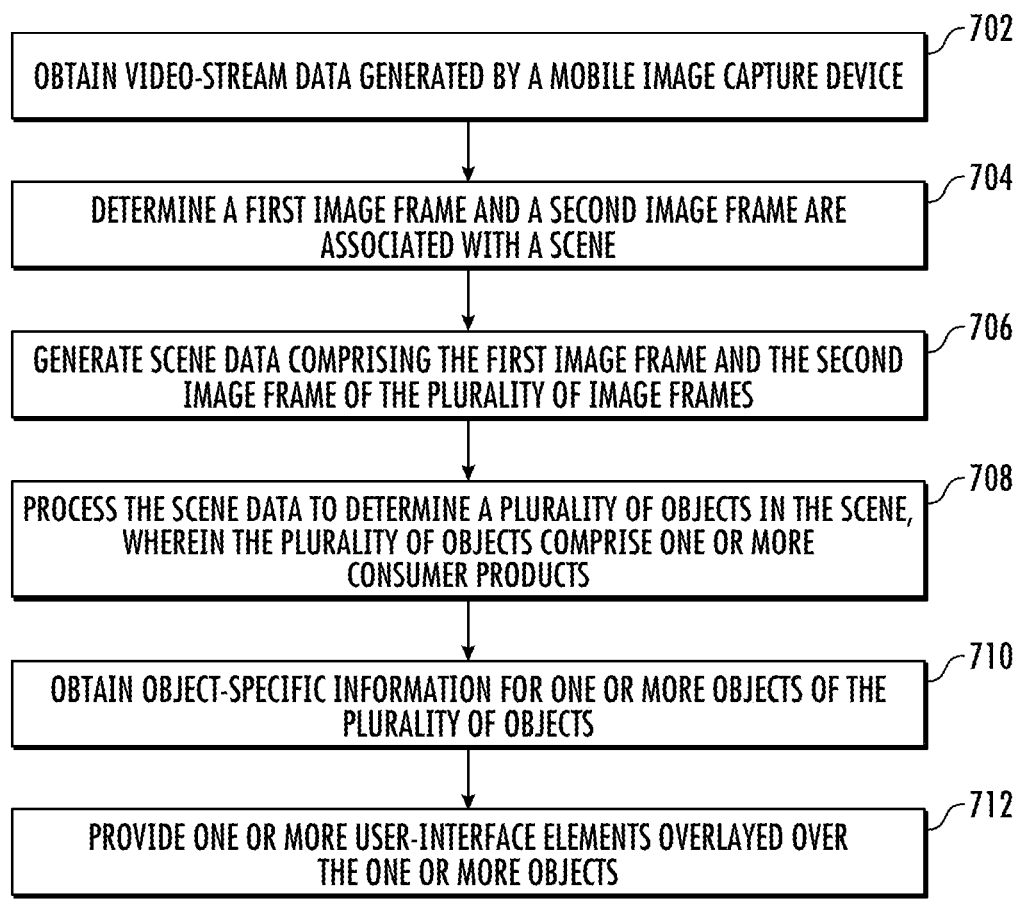
FIG. 7 depicts a flow chart diagram of an example method to perform object recognition and information display according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain video-stream data generated by a mobile image capture device. The video-stream data can include a plurality of image frames.

At 704, the computing system can determine a first image frame and a second image frame are associated with a scene. The first image frame can include a first set of objects, and the second image frame may include a second set of objects. In some implementations, determining the first image frame and the second image frame are associated with the scene can include determining the first set of objects and the second set of objects are associated with a particular object class. Alternatively and/or additionally, determining the first image frame and the second image frame are associated with the scene may include determining the first image frame and the second image frame were captured at a particular location.

At 706, the computing system can generate scene data comprising the first image frame and the second image frame of the plurality of image frames.

At 708, the computing system can process the scene data to determine a plurality of objects in the scene. The plurality of objects can include one or more consumer products. In some implementations, the plurality of objects can include a plurality of consumer products.

At 710, the computing system can obtain object-specific information for one or more objects of the plurality of objects. The object-specific information can include one or more details associated with each of the one or more objects. In some implementations, the object-specific information can include one or more consumer product details associated with each of the plurality of objects.

At 712, the computing system can provide one or more user-interface elements overlaid over the one or more objects. The one or more user-interface elements can be descriptive of the object-specific information. In some implementations, a plurality of user-interface elements overlaid over the plurality of objects can be provided. The plurality of user-interface elements can be descriptive of the object-specific information. The plurality of user-interface elements can be associated with the plurality of consumer products. In some implementations, providing the one or more user-interface elements overlaid over the one or more objects can include adjusting a plurality of pixels associated with an outside region surrounding the one or more objects.

Figure 8:
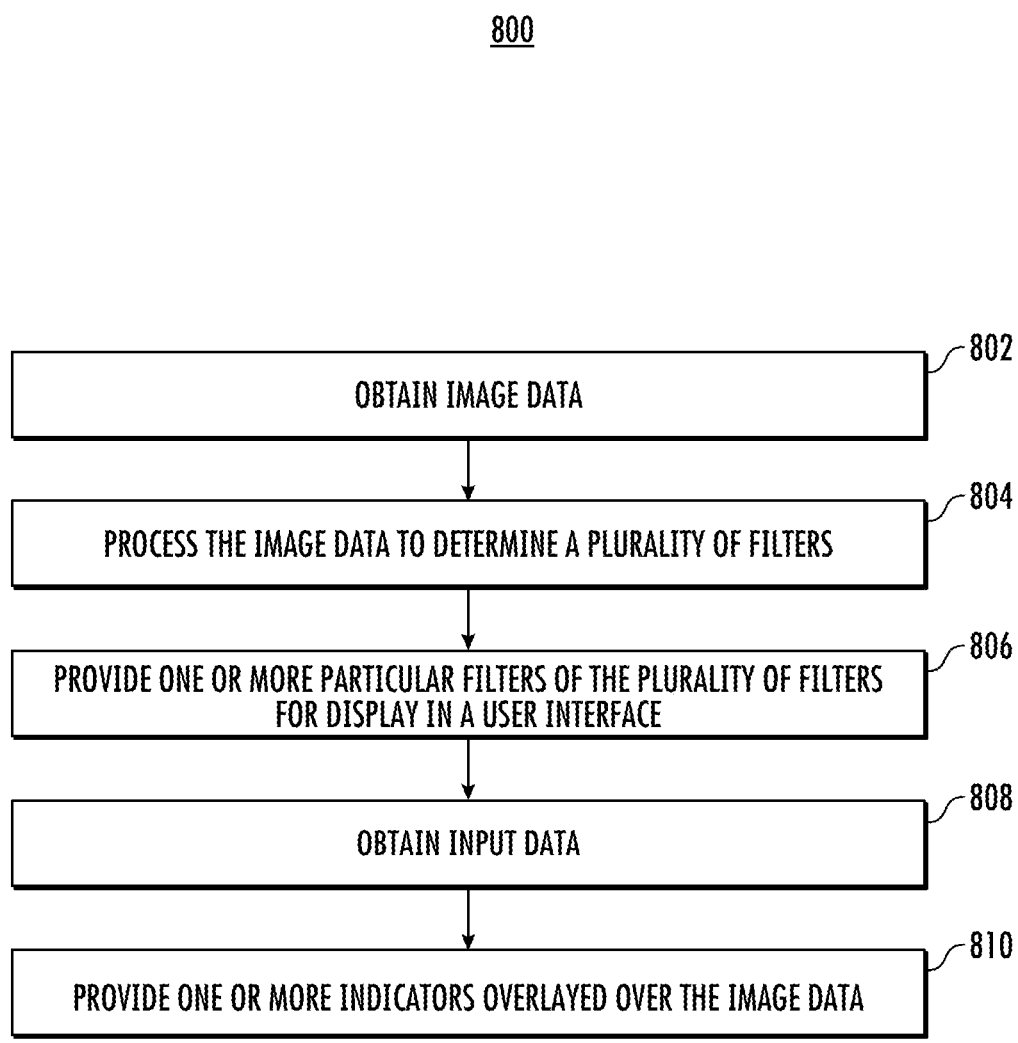
FIG. 8 depicts a flow chart diagram of an example method to perform object filtering according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain image data. The image data can depict a scene.

At 804, the computing system can process the image data to determine a plurality of filters. The plurality of filters can be associated with a plurality of objects in the scene. In some implementations, processing the image data to determine the plurality of filters can include processing the image data to recognize a plurality of objects in the scene, determining a plurality of differentiating attributes associated with differentiators between the plurality of objects, and determining the plurality of filters based at least in part on the plurality of differentiating attributes. The image data may be processed with one or more machine-learned models (e.g., a detection model, a segmentation model, a classification model, and/or a recognition model).

In some implementations, the computing system can determine the plurality of filters based at least in part on obtained context data. The context data can include a current location of the user, a specific user profile, global trends, a time of day, a time of year, and/or recent interactions by the user with one or more applications (e.g., recent searches in a search application). For example, recent queries of the user can be used as filters if the queries apply to at least one object in the scene. Additionally and/or alternatively, other users previously at a location may have utilized a certain tag at a higher rate than another tag. The certain tag may be provided to the user based on previous interactions of other users at the given location.

At 806, the computing system can provide one or more particular filters of the plurality of filters for display in a user interface. The one or more particular filters can be provided via user-interface chips provided as selectable user-interface elements.

At 808, the computing system can obtain input data. The input data can be associated with a selection of a specific filter of the plurality of filters.

At 810, the computing system can provide one or more indicators overlaid over the image data. The one or more indicators can be descriptive of one or more particular objects associated with the specific filter. In some implementations, the one or more indicators can include object-specific information associated with the one or more particular objects. Providing the one or more indicators overlaid over the image data can include an augmented-reality experience.

In some implementations, the computing system can obtain second input data. The second input data can be associated with a zoom input. The zoom input can be associated with the one or more particular objects. The computing system can obtain second information associated with the one or more particular objects. An augmented image can be generated based at least in part on the image data and the second information. The augmented image can include a zoomed-in portion of the scene associated with a region including the one or more particular objects. In some implementations, the one or more indicators and the second information can be overlaid over the one or more particular objects.

In some implementations, determining an object meets a certain criterion can involve obtaining object-specific information for the particular object, parsing the information into one or more segments, processing the segments to determine the particular segments classification (e.g., the segment relates to flavor, ingredients, source, location, etc.). The computing system can then process the segments and the given criteria to determine whether there is an association. The processing can involve natural language processing and can involve determining based on one or more knowledge graphs whether one or more segments are associated with the given criteria (e.g., does the segment include language matching or describing the given criteria (e.g., the segment states "citrus" or a synonym of citrus, and the criteria is an item with a citrus flavor).

Alternatively and/or additionally, the object-specific information can include indexed data that is pre-structured into one or more information categories (e.g., ratings, calories, flavors, uses, ingredients, emissions, etc.). The object-specific information can then be crawled when checking for key words or information associated with a selected tag.

In some implementations, the objects may be associated with particular tags before the tags are provided for display. For example, the plurality of objects may be identified, and a plurality of respective object-specific information sets can be obtained. The object-specific information sets can be parsed and processed to generate profile sets for each object. The profile sets can be compared against one another to determine differentiating attributes between objects. The differentiating attributes can be utilized to generate tags that narrow down the list of objects. The objects with the particular differentiating attribute can be pre-associated with the tag such that once the tag is presented and selected, the computing system can automatically highlight or indicate the specific objects that are associated with that particular tag.

Additionally and/or alternatively, the object-specific information can include one or more predetermined tags indexed in a database and/or knowledge graph. In response to obtaining the object-specific information, the computing system can determine what tags are universal to all objects in the scene and prune those tags. The remaining predetermined tags can be provided for display and selection. Once a tag is selected, the computing system can then indicate each of the objects that include an indexed reference to the particular pre-determined tag.

In some implementations, the one or more tags can be selected as to not obfuscate the user experience. The one or more tags can be based on search queries by other users when searching a given object class or a particular object. In some implementations, the computing system can store and retrieve data related to an initial search and a final search associated with particular objects and particular object classes. Additionally and/or alternatively, search query data of a specific user or a plurality of users can be indexed with the location of the user at the time of the given query or filter. The data can then be utilized to determine a tag for the particular user or other users. The one or more tags can be generated to predict what a user may wish to know about a scene, environment, and/or object. The computing system can generate the tags based on what a user should search to reach a final action (e.g., a purchase selection, a do-it-yourself step, etc.).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, the system comprising:
one or more processors; and
one or more non-transitory computer-readable media that collectively store instructions that, when executed by the one or more processors, cause the computing system to perform operations, the operations comprising:
obtaining image data generated by a mobile image capture device, wherein the image data depicts a scene;
processing the image data to determine a plurality of objects in the scene, wherein the plurality of objects comprise one or more consumer products;
obtaining, by performing a search for each of the plurality of objects, object-specific information for the plurality of objects, wherein the object-specific information comprises one or more details associated with each of the plurality of objects; and
processing the image data to determine a plurality of filters, wherein the plurality of filters are associated with the one or more details, wherein the plurality of filters are determined based on determining a plurality of differentiating attributes associated with differentiators between the plurality of objects based on the object-specific information, wherein the plurality of filters are descriptive of the differentiators;
providing one or more user-interface elements overlaid over the image data, wherein the one or more user-interface elements are descriptive of one or more particular filters of the plurality of filters;
obtaining input data, wherein the input data is associated with a selection of a specific filter of the plurality of filters; and
providing one or more indicators overlaid over the image data, wherein the one or more indicators are descriptive of one or more particular objects associated with the specific filter.

2. The system of claim 1, wherein the one or more user-interface elements comprise a plurality of product attributes associated with specific objects in the scene; and
wherein the operations further comprise:
obtaining input data associated with a selection of a particular user-interface element associated with a particular product attribute; and
wherein the one or more indicators are descriptive of one or more particular objects associated with the one or more particular product attributes.

3. The system of claim 2, wherein the particular product attribute comprises a threshold product rating; and
wherein the particular user-interface element comprises a slider associated with a range of consumer product ratings.

4. The system of claim 2, wherein the plurality of product attributes comprise a plurality of different product types.

5. The system of claim 1, wherein the operations further comprise:
obtaining context data associated with a user;
determining a query based on the image data and the context data; and
wherein the object-specific information is obtained based at least in part on the query.

6. The system of claim 5, wherein the context data is descriptive of a user location;
wherein the operations further comprise:
obtaining one or more popular queries associated with the user location; and
wherein the query is determined based at least in part on the one or more popular queries.

7. The system of claim 5, wherein the context data is descriptive of at least one of a user location, user preferences, past user queries, or user shopping history.

8. The system of claim 1,
wherein each filter comprises criteria associated with a subset of the plurality of objects;
wherein the operations further comprise: providing an augmented-reality overlay over one or more image frames, wherein the augmented-reality overlay comprises the one or more indicators being provided over respective objects that meet the respective criteria of the particular filter.

9. The system of claim 1, wherein the operations further comprise:
determining an object class associated with the plurality of objects; and
wherein the object-specific information is obtained based at least in part on the object class.

10. The system of claim 1, wherein the operations further comprise:
receiving audio data, wherein the audio data is descriptive of a voice command;
determining a particular object associated with the voice command; and
providing an augmented image frame that indicates the particular object associated with the voice command.

11. A computer-implemented method, the method comprising:
obtaining, by a computing system comprising one or more processors, video-stream data generated by a mobile image capture device, wherein the video-stream data comprises a plurality of image frames;
determining, by the computing system, a first image frame and a second image frame are associated with a scene;
generating, by the computing system, scene data comprising the first image frame and the second image frame of the plurality of image frames;
processing, by the computing system, the scene data to determine a plurality of objects in the scene, wherein the plurality of objects comprise one or more consumer products;
obtaining, by the computing system and by performing a search for each of the plurality of objects, object-specific information for each of the plurality of objects, wherein the object-specific information comprises one or more details associated with a respective object;
generating, by the computing system, a plurality of tags associated with the plurality of objects based on determining distinguishing features between the plurality of objects based on the object-specific information, wherein the plurality of tags comprise augmented-reality renderings that depict object-specific details associated with the distinguishing features; and
providing, by the computing system, a plurality of user-interface elements overlaid over the plurality of objects, wherein the plurality of user-interface elements are descriptive of the plurality of tags.

12. The method of claim 11, wherein:
the plurality of objects comprise a plurality of consumer products;
the object-specific information comprises one or more consumer product details associated with each of the plurality of objects; and
providing, by the computing system, the plurality of user-interface elements overlaid over the plurality of objects comprises:
providing, by the computing system, the plurality of user-interface elements overlaid over the plurality of objects, wherein the plurality of user-interface elements are descriptive of the object-specific information, and wherein the plurality of user-interface elements are associated with the plurality of consumer products.

13. The method of claim 11, wherein the first image frame comprises a first set of objects, and wherein the second image frame comprises a second set of objects; and
wherein determining, by the computing system, the first image frame and the second image frame are associated with the scene comprises:
determining, by the computing system, the first set of objects and the second set of objects are associated with a particular object class.

14. The method of claim 11, wherein determining, by the computing system, the first image frame and the second image frame are associated with the scene comprises:
determining, by the computing system, the first image frame and the second image frame were captured at a particular location.

15. The method of claim 11, wherein providing, by the computing system, the plurality of user-interface elements overlaid over the plurality of objects comprises adjusting a plurality of pixels associated with an outside region surrounding the plurality of objects.

16. One or more non-transitory computer-readable media that collectively store instructions that, when executed by one or more computing devices, cause the one or more computing devices to perform operations, the operations comprising:
obtaining image data, wherein the image data depicts a scene;
processing the image data to determine a plurality of filters, wherein the plurality of filters are associated with a plurality of objects in the scene, wherein processing the image data to determine the plurality of filters comprises:
determining the image data depicts a plurality of objects;
determining a plurality of object-specific information sets for the plurality of objects based on searching one or more databases;
determining, based on the plurality of object-specific information sets, a plurality of differentiating attributes associated with differentiators between the plurality of objects; and
generating the plurality of filters based on the plurality of differentiating attributes;
providing one or more particular filters of the plurality of filters for display in a user interface;
obtaining input data, wherein the input data is associated with a selection of a specific filter of the plurality of filters; and
providing one or more indicators overlaid over the image data, wherein the one or more indicators are descriptive of one or more particular objects associated with the specific filter.

17. The one or more non-transitory computer-readable media of claim 16, wherein processing the image data to determine the plurality of filters comprises:
processing the plurality of object-specific information sets to generate a profile set for each of the plurality of objects; and
wherein the plurality of differentiating attributes are determined based on comparing profile sets for each of the plurality of objects.

18. The one or more non-transitory computer-readable media of claim 16, wherein processing the image data to recognize the plurality of objects in the scene comprises:
processing the image data with a machine-learned model.

19. The one or more non-transitory computer-readable media of claim 16, wherein the operations further comprise:
obtaining second input data, wherein the second input data is associated with a zoom input, wherein the zoom input is associated with the one or more particular objects;
obtaining second information associated with the one or more particular objects; and
generating an augmented image, wherein the augmented image comprises a zoomed-in portion of the scene associated with a region comprising the one or more particular objects, and wherein the one or more indicators and the second information are overlaid over the one or more particular objects.

20. The one or more non-transitory computer-readable media of claim 16, wherein the one or more indicators comprise object-specific information associated with the one or more particular objects, and wherein providing the one or more indicators overlaid over the image data comprises an augmented-reality experience.

* * * * *